(12) United States Patent
Olson et al.

(10) Patent No.: US 11,397,434 B2
(45) Date of Patent: Jul. 26, 2022

(54) CONSISTENCY VALIDATION FOR VEHICLE TRAJECTORY SELECTION

(71) Applicant: Zoox, Inc., Foster City, CA (US)

(72) Inventors: Sy Kelly Olson, Oakland, CA (US); Collin MacGregor, Foster City, CA (US); Jefferson Bradfield Packer, San Francisco, CA (US); Janek Hudecek, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 244 days.

(21) Appl. No.: 16/539,878

(22) Filed: Aug. 13, 2019

(65) Prior Publication Data

US 2021/0048817 A1    Feb. 18, 2021

(51) Int. Cl.
*G05D 1/00* (2006.01)
*G05D 1/02* (2020.01)
(Continued)

(52) U.S. Cl.
CPC .......... *G05D 1/0088* (2013.01); *B60W 30/00* (2013.01); *B60W 40/114* (2013.01);
(Continued)

(58) Field of Classification Search
CPC .......... G05D 1/0088–0212; G05D 2201/0213; B60W 30/00; B60W 40/114; B60W 2520/14
See application file for complete search history.

(56) References Cited

U.S. PATENT DOCUMENTS 8,849,494 B1    9/2014 Herbach et al.
9,612,123 B1 *  4/2017 Levinson .............. B60W 30/09
(Continued)

FOREIGN PATENT DOCUMENTS

RU    2280608 C2    7/2006
RU    2646771 C1    3/2018

OTHER PUBLICATIONS

Best et al., "Autonovi: Autonomous vehicle planning with dynamic maneuvers and traffic constraints," 2017 IEEE/RSJ International Conference on Intelligent Robots and Systems (IROS), Sep. 24, 2017, 9 pages.
(Continued)

*Primary Examiner* — Calvin Cheung
(74) *Attorney, Agent, or Firm* — Davis Wright Tremaine LLP

(57) ABSTRACT

The present disclosure is directed to performing one or more validity checks on potential trajectories for a device, such as an autonomous vehicle, to navigate. In some examples, a potential trajectory may be validated based on whether it is consistent with a current trajectory the vehicle is navigating such that the potential and current trajectories are not too different, whether the vehicle can feasibly or kinematically navigate to the potential trajectory from a current state, whether the potential trajectory was punctual or received within a time period of a prior trajectory, and/or whether the potential trajectory passes a staleness check, such that it was created within a certain time period. In some examples, determining whether a potential trajectory is feasibly may include updating a set of feasibility limits based on one or more operational characteristics of statuses of subsystems of the vehicle.

16 Claims, 16 Drawing Sheets

(51) Int. Cl.
  *B60W 40/114* (2012.01)
  *B60W 30/00* (2006.01)
(52) U.S. Cl.
  CPC ....... *G05D 1/0212* (2013.01); *B60W 2520/14* (2013.01); *G05D 2201/0213* (2013.01)

(56) References Cited

U.S. PATENT DOCUMENTS

| | | | |
|---|---|---|---|
| 10,202,144 | B2 | 2/2019 | Brown et al. |
| 10,384,648 | B1 | 8/2019 | Chapin |
| 10,663,969 | B1 | 5/2020 | LaForge et al. |
| 10,689,004 | B1 | 6/2020 | Kulkarni et al. |
| 2007/0179685 | A1 | 8/2007 | Milam et al. |
| 2010/0030473 | A1 | 2/2010 | Au et al. |
| 2010/0054538 | A1 | 3/2010 | Boon |
| 2011/0298602 | A1 | 12/2011 | Chen et al. |
| 2017/0090476 | A1 | 3/2017 | Letwin et al. |
| 2017/0123429 | A1 | 5/2017 | Levinson et al. |
| 2017/0166204 | A1 | 6/2017 | Yoo et al. |
| 2018/0003515 | A1 | 1/2018 | Saru et al. |
| 2018/0004210 | A1 | 1/2018 | Iagnemma et al. |
| 2018/0046182 | A1 | 2/2018 | Joyce et al. |
| 2018/0052470 | A1 | 2/2018 | Kim et al. |
| 2018/0348767 | A1 | 12/2018 | Jafari Tafti et al. |
| 2019/0056735 | A1 | 2/2019 | Koopman et al. |
| 2019/0225237 | A1 | 7/2019 | Ishikawa et al. |
| 2019/0286151 | A1 | 9/2019 | Palanisamy et al. |
| 2019/0291728 | A1 | 9/2019 | Shalev-Shwartz et al. |
| 2019/0346851 | A1 | 11/2019 | Liu et al. |
| 2019/0367022 | A1* | 12/2019 | Zhao ............... B60W 30/09 |
| 2019/0369637 | A1* | 12/2019 | Shalev-Shwartz ........................ G06K 9/00791 |
| 2020/0010083 | A1 | 1/2020 | Staehlin |
| 2020/0118361 | A1 | 4/2020 | Zula et al. |
| 2020/0150665 | A1 | 5/2020 | Refaat et al. |
| 2020/0150671 | A1 | 5/2020 | Fan et al. |
| 2020/0150681 | A1 | 5/2020 | Wang et al. |
| 2020/0209848 | A1 | 7/2020 | Mercep et al. |

OTHER PUBLICATIONS

International Search Report and Written Opinion dated Nov. 5, 2020, Patent Application No. PCT/US2020/046034, 11 pages.

* cited by examiner

CONSISTENCY VALIDATION FOR VEHICLE TRAJECTORY SELECTION

BACKGROUND

Autonomous vehicles are programmed with safety in mind, among other goals, such as passenger comfort, predictability, and responsiveness. Some systems of autonomous vehicles are important to ensure safety, such as the navigation system. The navigation system may have to take into account a large number of variables that can be difficult to account for, making safe and effective navigation quite complex. For example, there may be multiple subsystems of the autonomous vehicle that interact in complex ways. In additional environmental changes may also increase dramatically the complexity of safe navigation. These interactions of multiple subsystems and the environment may introduce variability and unpredictability such that making sure passengers, pedestrians, property, etc. are safe becomes more difficult.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
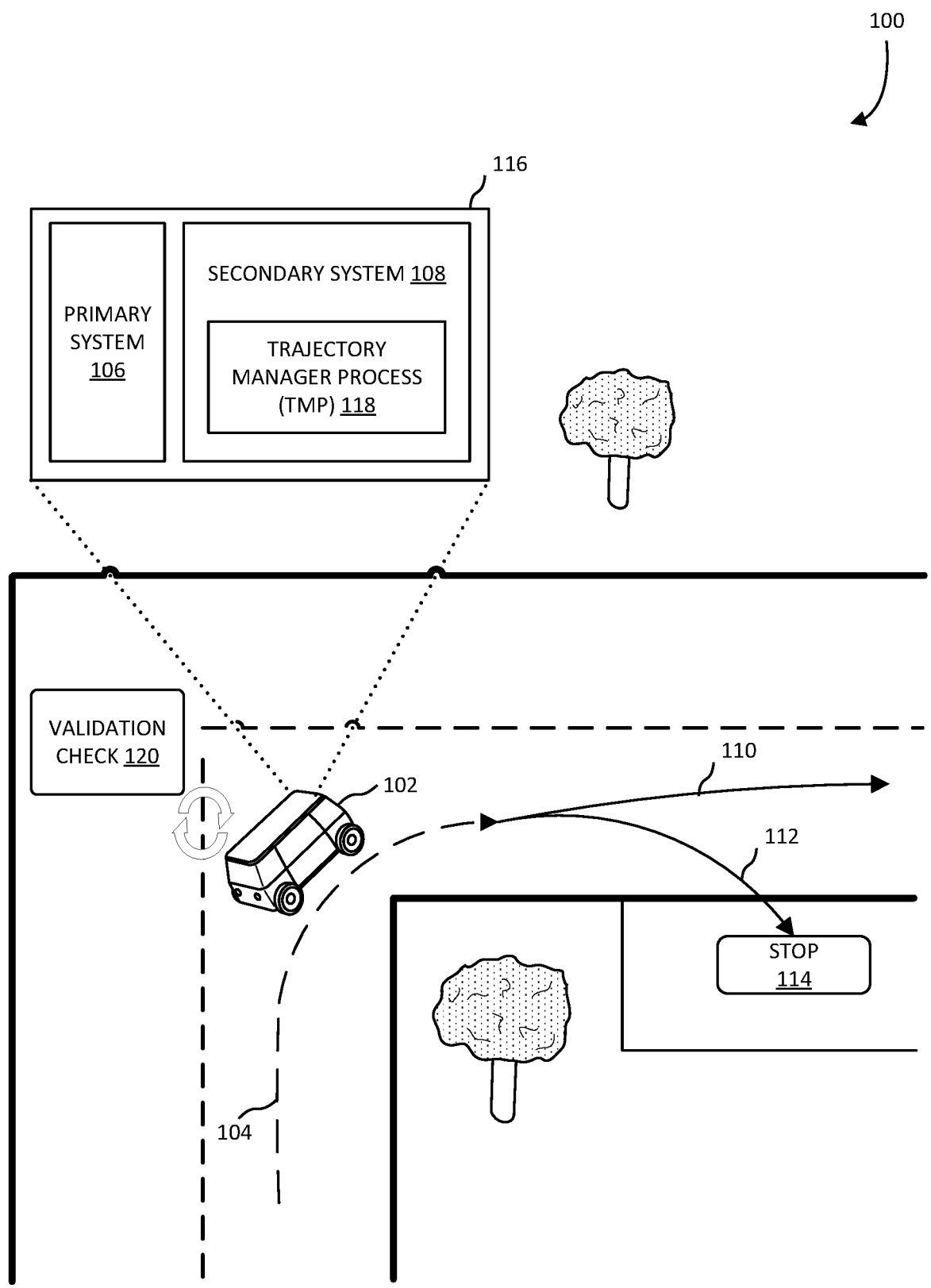
FIG. 1 is an example illustration of an autonomous vehicle selecting one of multiple trajectories for navigation.

This disclosure describes methods, apparatuses, and systems for verifying and selecting a future trajectory for a device, such as an autonomous vehicle. In some examples, an artificial intelligence ("AI") unit of an autonomous vehicle considers inputs, such as from various subsystem of the vehicle, and outputs a selection of possible trajectories to a trajectory manager process ("TMP") that can operate as system to perform collision avoidance by selecting and verifying one of the provided trajectories using particular criteria. In this example, the TMP may then output the selected trajectory to a drive manager that controls, possibly among other systems, the propulsion systems of the vehicle.

In some aspects, the TMP performs criteria checks on the provided trajectories, independent of what trajectories the AI engine outputs, so that even if the AI system outputs an unsafe trajectory, the TMP will not send the corresponding signals to the drive manager process or drive actuators, to cause the vehicle to navigate the invalid, e.g., unsafe, trajectory. In some instances, the TMP may output a trajectory to bring the vehicle to a stop if none of the proffered trajectories meet the TMP's criteria.

In some aspects, the TMP evaluates the trajectories for validity. Testing for validity may include a number of different tests or evaluations, such as by checking for punctuality, consistency, staleness, and/or feasibility. For example, a given trajectory may be evaluated for punctuality, such that it was received within a certain time period of a previous trajectory. In other examples, a given trajectory may be evaluated for consistency of the tested trajectory with a current state of the vehicle and/or a previous trajectory (e.g., is the new trajectory and/or reference within a threshold distance of the previous trajectory). In some aspects, a trajectory may be tested for staleness, such as to verify that the trajectory was not generated too long in the past. In some cases, staleness may be considered or referred to as part of the consistency check. In yet other examples a trajectory may be evaluated for feasibility of the vehicle navigating the tested trajectory, such as based on physical capability or limits of the vehicle. In some aspects two or more of these validity tests may be performed on a potential trajectory, to ensure that the trajectory is safe, will not result in unwanted physical strain on a passenger of the vehicle, and so on.

The results of the validity evaluation may be output as a signal, indicating at least whether the trajectory is valid, e.g., passed the evaluation, or invalid, such that it failed the evaluation. The validity signal may take any of a number of forms, and include a simple value, such as a binary value, indicating whether the trajectory passed the evaluation and is, in fact valid. In some cases, an identifier of the trajectory may also be included. In yet other cases, more details of the trajectory may also be included. The validity signal or the selected trajectory itself may be sent to the drive manager process or drive actuators to cause the vehicle to perform the valid trajectory. In some cases, the validity signal, whether pass or fail, may be communicated to the AI engine to enable selecting another trajectory or for a number of other reasons.

In some aspects, the TMP may also perform a collision test on a potential trajectory. In these cases, a viable trajectory is one that at least meets the validity tests and the collision test. In other cases, other evaluation or verification tests may be used, either alone or in combination with the examples mentioned above. In some aspects, the one or more validity checks may include a punctuality check, which relates to how much time has passed since the trajectory was received. For example, the secondary system may expect a trajectory to be received at a particular frequency (e.g., every four seconds). In such an example, a difference in time between subsequently received trajectories which is more than four seconds, for example, might be considered a failure of the punctuality criteria, as it may indicate that one or more subsystems of the vehicle is not operating correctly or as expected (e.g., due to latency, transmission issues, planning difficulty, etc.). In determining whether the punctuality requirement is met, the TMP may compare a received time of the trajectory and a present time to determine if the difference between the two is greater than a predetermined punctuality limit.

In some aspects, the one or more validity checks may include a consistency evaluation, which relates to precluding large jumps in vehicle state or command from one trajectory to the next, based on some predetermined consistency constraints. For example, if the speeds of a present trajectory and a next trajectory are too dissimilar, the next trajectory might be flagged as lacking consistency. The results of the consistency or kinematic evaluation may be in the form of a kinematic validity or kinematic validity value indicating whether and to some cases, what extent, a given trajectory is consistent.

In some examples, the one or more validity checks may comprise a staleness check in which the system determines whether an age of the generated trajectory is less than or equal to a threshold age. In such examples, the trajectories may comprise a timestamp when they were generated. A difference between a current time and the generated time may be compared against the threshold to determine whether the trajectory is out-of-date. As a non-limiting example, despite being punctual (e.g., received within 4 seconds of the previous trajectory as in the previous example), a timestamp of the trajectory may indicate that the generated time is more than 100 ms old (exceeding the threshold of 50 ms), in which case the trajectory is marked as invalid.

In some aspects, the one or more validity checks may include a feasibility check, which relates to verifying that the trajectory being validated is within the current dynamic capabilities of the vehicle (e.g., a new trajectory that commands a velocity of 180 KPH or a lateral acceleration of 6 m/s/s may not be followed).

In some cases, the system monitor may modify a default set of capability limits of the vehicle based on operational characteristics of the vehicle. For example, the TMP may detect that one or more tires have low pressure, a battery is not operating at full capacity, a motor is operating at 75% power, etc. The TMP may correlate different operational statuses, numeric or qualitative, to changes to make to one or more feasibility limits placed on the vehicle. Based on these and other operational characteristics, the system monitor may update a one or more feasibility values or limits imposed on the vehicle. The TMP may access these values and verify potential trajectories based on the most current values. In some aspects, the results of the feasibility evaluation may be output as a feasibility value or signal or feasibility validity signal.

A system monitor may monitor states of subsystems within the vehicle and can send a request to the TMP that can override the TMP's decision as to the trajectory, and/or send operational status updates that may inform and modify the TMP's evaluation of potential trajectories. In some cases, the TMP may receive updates (e.g., of one or more operational characteristics) from a vehicle or device monitoring system or system monitor, at various intervals, periodically, upon the occurrence of certain events, etc. These updates may be of one or more subsystems affecting the operation of the vehicle. In some cases, the TMP may change its criteria for selecting/verifying a trajectory based on the update or updates. In some cases the system monitor may communicate a trajectory request and/or other constraints to the TMP, which may affect or even override the selection criteria implemented by the TMP.

In some aspects, a set of vehicle capability or feasibility limits may be determined for a vehicle operating in a normal state or under normal operating conditions. The system monitor may detect and provide updates as to whether various subsystems of the vehicle are operating normally, or have a reduced operational state, such that operation of the vehicle in some way is diminished. The system monitor and/or the TMP may update that set of vehicle capability limits based on the operational updates. The TMP may then modify its criteria, based on the updated set of vehicle capabilities, when determining whether a trajectory is valid. In a specific example, the vehicle capability limits may be used to determine if a trajectory is feasible, such as via the feasibility check. As a non-limiting example, reduced pressure or braking capacity can be associated with a reduced maximum acceleration (lateral and/or longitudinal).

In some aspects, the trajectory verification process may also include a collision check. The collision checking criteria may include the TMP rejecting trajectories that it determines would contain imminent collisions with agents or objects. In some cases, a trajectory has a separate validity criteria that covers the punctuality, consistency, staleness, and feasibility and has a collision-free requirement. In those cases, there are two tests, validity and collision-freeness, but underlying those two tests may be multiple criteria.

The collision check may be used to prevent the expression of trajectories that contain a predicted collision with any agent or obstacle with a before the vehicle is determined to be able to stop (exceeds a braking distance or related value) or avoid the object. A trajectory that contains any expected collision that is not avoidable may not be followed; or if all of the available trajectories include expected collisions, the trajectory that minimizes expected collision energy or other metric may be the selected trajectory.

The collision check might involve executing a free space checker, evaluating an object list based trajectory predictor, a processor using machine learning with a heatmap, or other approaches. Some trajectories might be checked at every frame for possible collisions, but other trajectories might not need to be checked. For example, if an emergency stop ("E-Stop") trajectory is the lowest possible trajectory, it might not need to be repeatedly checked to determine if it will result in a collision, as that trajectory is likely the last resort and has a goal of slowing and likely already represents a last option for coming to a stop, with a locking of steering and applying maximum deceleration (by braking or otherwise), and is likely only to be used when there are multiple system failures or having questionable status.

The trajectories available to the TMP might have a hierarchy wherein a first trajectory is higher in the hierarchy than a second trajectory and the second trajectory is higher in the hierarchy than a third trajectory, etc. The first trajectory might be a nominal operating trajectory and trajectories lower in the hierarchy might correspond to non-ideal or error conditions, such as where a higher trajectory is not valid. For example, it might be that the first trajectory is a trajectory that is used, unless there is some error found with the first trajectory and the second trajectory is a contingent trajectory that would be used in that case.

In at least some examples, either one or more of a primary and/or secondary trajectory received may be stored to be used in a subsequent frame in the event that newly acquired trajectories are not valid and/or collision-free. Such trajectories may be referred to as stored trajectories. In any one or more example, any trajectory (either newly acquired or stored) may be modified if such modifications would lead to a scenario which prevents (or minimizes severity of, etc.) an impact. In some instances, such modifications might be limited to longitudinal modifications such as adding additional braking to the trajectory, but in other instances, other modifications (e.g., slight swerving) might be provided for. In accordance with the hierarchies, the system may prefer the first (or primary), secondary (or alternate/contingent), modified secondary, modified stored secondary, and finally, if none of the above trajectories mitigate a collision, an emergency stop (also referred to herein as an "E-Stop"). In such examples, the E-Stop may be a trajectory that seeks to bring the autonomous vehicle to a stop quickly, within the mechanical abilities and passenger safety limits of the autonomous vehicle.

It should be understood that examples and descriptions herein that refer to these specific set of trajectories could be modified to cover examples with other sets of trajectories that are provided in a hierarchy. Also, while the specific example provides for a strictly ordered hierarchy, some instances might provide for a hierarchy where more than one type of trajectory has the same level. In such an instance, there might be a first, second, third, and fourth trajectories with the first trajectory being considered highest on the trajectory, the second and third considered equally at the next lowest level, and the fourth being the lowest level trajectory.

In the general case, there is a hierarchy of trajectories and when in a normal operating state, the TMP considers the first trajectory and uses it if it is valid and collision-free. In that normal operating state, each of the trajectories can be checked at each frame when new trajectories are provided and the highest valid and collision-free trajectory is used. In at least some examples, if either of the primary or secondary are collision-free and valid, the TMP may select such a trajectory even where lower level trajectories are not valid or not collision-free. The TMP can then store a state variable representing the trajectory used. If the normal operation is such that the first trajectory is valid and collision-free, then dropping down to a lower trajectory can be indicative of an error or anomalous situation. For example, first trajectory might be valid and collision-free when generated, but then a fast-moving object passes in front of the autonomous vehicle so that when the first trajectory is checked, it validates, but is not collision-free. This would result in the TMP using a lower trajectory and updating the state variable to indicate which was used. The stored value of the state variable might be used in future frames to limit what trajectory the TMP uses, at least until there is a release of the error condition.

In general, a trajectory can be represented by a data structure that defines vectors, paths, vehicle states (position, orientation, velocity, and/or acceleration), commands, etc. to be performed over time, from a start state to a terminus of the trajectory and/or including a sequence of controls associated with such waypoints (e.g., accelerations, steering, yaw rate, and the like). A trajectory may not necessarily play out to its terminus, and may be overridden. The trajectories provided to the TMP may be trajectories that involve the vehicle slowing to a stop and trajectories that involve the vehicle moving according to some details of the trajectory, changing direction, changing speed, etc. A trajectory might include data representing signals that are to be sent to drive actuators, such as those for brakes, steering, accelerators, suspensions, etc.

A trajectory that, if followed to its terminus, would necessarily lead to the vehicle stopping due to abnormal or safety conditions is referred to herein as a stopping trajectory, while others are nominal trajectories. Some nominal trajectories may bring the autonomous vehicle to a stop, for nonanomalous conditions, such as driving up to a stop sign, stopping at a stop light, waiting for a pedestrian to cross, pulling over to pick up people, etc. A stopping trajectory has a stationary position as a terminus for safety-related reasons or anomalous conditions.

The TMP might also have a stored stopping trajectory that is used by the TMP when it has no other proffered trajectory that meets the TMP's criteria. If played out to the end of the trajectory, the stored stopping and or received stopping trajectories would end with the vehicle being stationary. In other words, the terminus of such a trajectory is a stationary vehicle. Not all trajectories are necessarily played out to their terminus. For example, a newly acquired trajectory may be received before executing the previously received trajectory to its terminus. In at least some examples, stopping trajectories may comprise secondary and/or contingent trajectories as described above.

In some examples, such stopping trajectories may not involve coming to a stop, but may provide alternate paths and/or controls as a contingency for problems with a primary trajectory.

The AI might provide just two trajectories, a primary (nominal) trajectory and a secondary (e.g., stopping) trajectory, but in some instances, the AI might provide more than two. One example would be where the AI provides a primary trajectory that has the vehicle continuing in a lane, a primary trajectory that has the vehicle pulling over in ~10 seconds, a secondary trajectory that has the vehicle braking, a secondary trajectory that has the vehicle changing lanes and braking, etc. In another example, the AI creates and emits a new primary trajectory and a new secondary trajectory every 100 ms or so. A modified secondary trajectory might be a trajectory that the TMP created by applying a longitudinal declaration to a secondary trajectory.

In a more general case, what is provided is a set of instructions, which could be instructions about a trajectory and one, two, or more sets of instructions could be provided. Other sets of instructions might be generated from those provided, such as a set of instructions derived from a previously provided set of instructions that are stored, a set of instructions that are transformed or modified versions of a received set of instructions, and a fixed set of instructions. Where the set of instructions includes a trajectory, it might include instructions unrelated to a trajectory, such as instructions for messages, lighting, etc., and/or instructions somewhat related to a trajectory, such as turn signaling or other actions to be taken in connection with a trajectory. In this case, a state variable might be provided for that represents a maximum level in a hierarchy of levels where a set of instructions having a level above that maximum level would not necessarily be executed, and when a set of instructions is found to be invalid or anomalous, the maximum level is set to a level below the level of that invalid or anomalous set of instructions. The state variable might remain at that level or below until a release signal is received, resetting the state variable to a higher level, perhaps the highest level. For example, a request indicative of selecting a contingent trajectory over a nominal trajectory might set the state variable to represent a vehicle trajectory state that is a contingent state representing selecting a contingent trajectory over a nominal trajectory and a release signal might to reset the vehicle trajectory state to a nominal request state indicative of selecting a nominal trajectory over a contingent trajectory. The release signal might be one received from a remote system configured to transmit signals in response to receiving an input from a user.

In an example system, a system monitor monitors states of systems within the vehicle and can send a request to the TMP that can override the TMP's decision as to the trajectory in a "downward" direction (e.g., primary to secondary to modified secondary to stored secondary to modified stored secondary to "E-Stop", etc.). The request might be a request for a particular type of trajectory, selected from primary, secondary, or "E-Stop" that the system monitor would use to signal that the system monitor would deem either of those to be acceptable options. The request might be an override request that requests a contingent trajectory over a nominal trajectory. In some logic tables, the ultimate result is the same for more than one system monitor trajectory type request. As an example, if the TMP is going to decide to invoke a secondary trajectory request based on some combination of states, the outcome may well be the secondary trajectory whether the system monitor requests the primary trajectory type or the secondary trajectory type. In places herein, that might be referred to as the system monitor specifying a primary or secondary trajectory type, but should be understood as described above.

In another example, if the AI provides trajectories to the TMP and the TMP finds all of those to be acceptable, it might select a primary trajectory, but then if the system monitor processed inputs to indicate that all four tires on a four-tire vehicle had tire pressures of 15 PSI (i.e., running flat), the system monitor would signal a request for an "E-Stop" trajectory.

In operation, the system monitor might signal for a secondary trajectory when an anomalous situation was sensed, such as detecting a mechanical or electrical error. In response, the TMP might provide the drive manager with a secondary trajectory and while the drive manager was actuating the secondary trajectory to bring the autonomous vehicle to stationary, the system monitor might detect a satisfactory resolution to the problem and signal a request for a nominal (e.g., primary) trajectory while the TMP would otherwise provide another trajectory.

In some instances, recovery from some conditions is deemed significant enough to require human intervention. In such cases, the system monitor might issue a request for a secondary trajectory or "E-Stop" trajectory until it receives a fault clearing signal from a human-interactive system (and/or a remote system having additional computation ability for an artificially intelligent decision), such as a system monitor release signal from a teleoperator system.

The described systems and techniques may provide a number of advantages and benefits, such as safer operation of an autonomous vehicle or other movement enabled device, through redundant trajectory validation and collision checking, particularly in updating feasibility limits for the vehicle based on current operating status of subsystems of the vehicle. The described systems and techniques may also provide for improved resource economy, such as reduced memory and processing needs through the use of distinct validity checks with predefined criteria. In some aspects, the described systems and techniques may enable using less bandwidth in communicating information to select a trajectory, through the use of specific validity criteria, among other benefits and advantages, which are described throughout this disclosure.

FIG. 1 is an example illustration 100 of an autonomous vehicle 102 selecting and verifying one of multiple trajectories 110, 112 for navigation. As illustrated, autonomous vehicle 102 may include a planning system 116. The planning subsystem 116 may include primary system or AI engine 106, which may generate trajectories for autonomous vehicle 102 to follow or navigate, such as current trajectory 104, and trajectories 110, 112, which may be navigated by the autonomous vehicle 102 in the future. To increase safety in operation of the autonomous vehicle 102, to help further avoid collisions, to add redundancy, and for a variety of other reasons, a secondary system 108 may be implemented to verify a number of different attributes of possible trajectories generated by the primary system 106 before the autonomous vehicle is instructed to follow one of those trajectories.

The secondary system 108 may include a trajectory manager process or system (TMP) 118 that receives trajectories generated by primary system 106 and performs a number of validation checks 120 on the trajectories to ensure that the trajectories are valid and/or do not result in any avoidable collisions. The TMP 118 may receive two or more trajectories from the primary system 106 to verify or evaluate. For example, the primary system 106 may generate, for each time period, at least one first or primary trajectory 110, which may include continuing forward momentum of the autonomous vehicle 102 for at least some distance. The primary system 106 may also generate at least one secondary trajectory 112, which may result in the autonomous vehicle 102 stopping at a point 114, which may be any time in the future. In other examples, the TMP 118 may evaluate any of a number of trajectories for autonomous vehicle 102 for any given period of time.

Upon receiving the potential trajectories, the TMP 118 may perform a number of validation checks 120 on the primary and secondary trajectories 110, 112 to ensure that the chosen trajectory is safe and does not result in abrupt movement or discomfort to a passenger of the autonomous vehicle 102. These validation checks may include a punctuality check, a consistency check, a staleness check, and/or a feasibility check, as will be described in greater detail below. In some aspects, the TMP 118 may also perform a collision check on the trajectories to verify that no avoidable collision will occur on a selected trajectory.

In some cases, the secondary system 108 or the primary system 106 may monitor a number of subsystems of the autonomous vehicle 102. When one or more of the subsystems is not functioning as it should, such as a normal operating state would dictate, the primary or secondary system 106, 108 may modify a set of capability limits for the vehicle. In determining whether a trajectory is feasible for the autonomous vehicle, the TMP 118 may determine whether the autonomous vehicle can safely navigate to and follow the new trajectory based on the set of capability limits for the vehicle. In this way, trajectories may be validated based on the current operating conditions of the vehicle, to increase safety.

Autonomous vehicle 102 may include a number of hardware and software components implementing a propulsion system and control and planning systems for directing the propulsion system to move the vehicle through various terrain and obstacles, transport passengers, etc. The autonomous vehicle 102 may include a number of subsystems, as described in greater detail below in reference to FIG. 16. It should be appreciated that this disclosure is mainly focused on verifying trajectories for an autonomous vehicle, the techniques described herein are equally applicable to any of a number of different kinds of devices, such as any device that includes some type of propulsion or movement system.

In some aspects, the planning system 116 may be an example of planning subsystem 1628 described below in reference to FIG. 16. The planning system 116, and the primary system 106 and secondary system 108, may include one or more processors and memory including instructions for generating and verifying trajectories for an autonomous vehicle, or more generally, any of a number of different kinds of devices.

Figure 2:
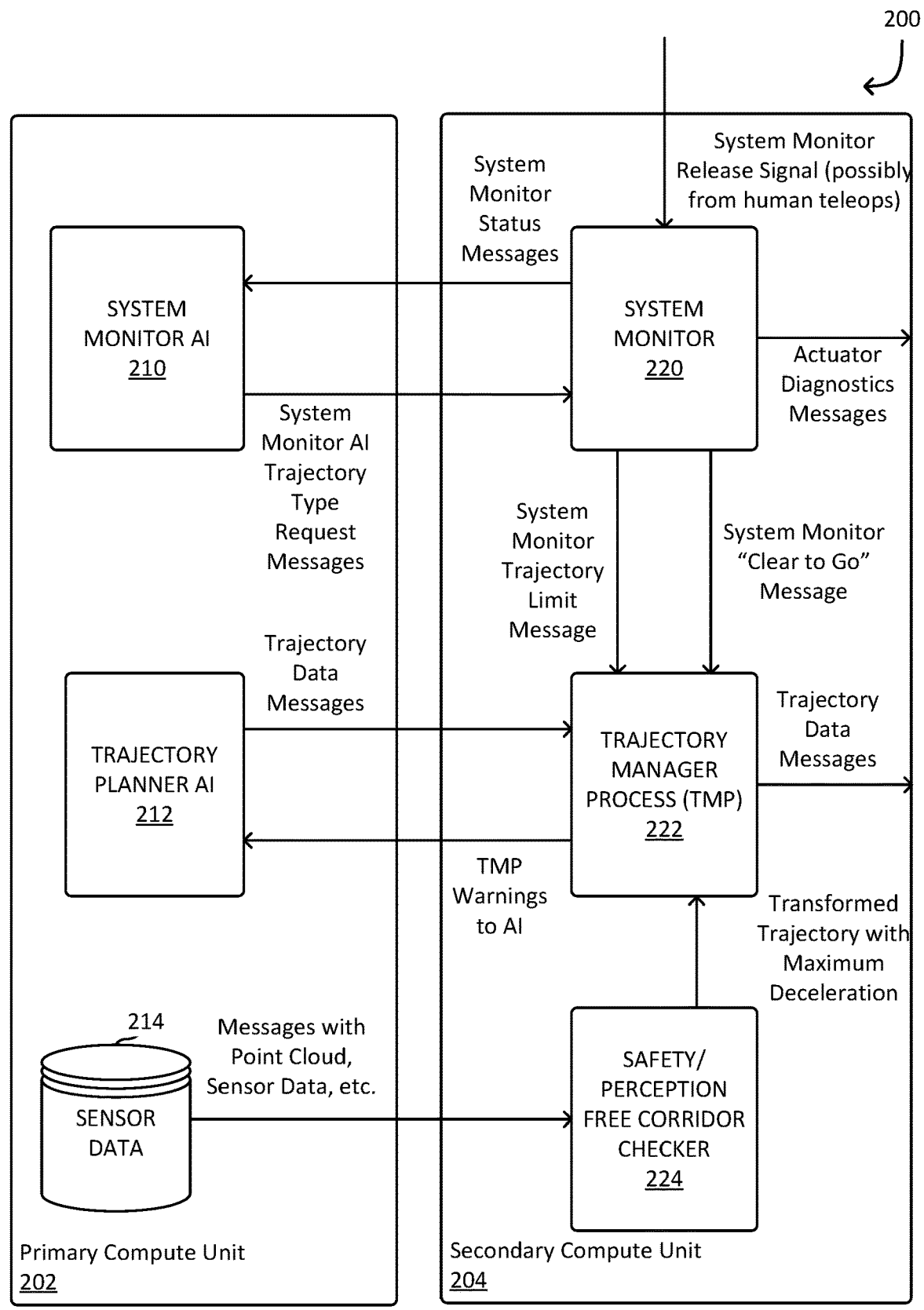
FIG. 2 is a high-level block diagram illustrating examples of some elements of an autonomous vehicle management and/or control system, including a primary computing system and a secondary computing system.

FIG. 2 is a high-level block diagram illustrating examples of some elements of an autonomous vehicle management and/or control system 200, including a primary compute unit 202 and a secondary compute unit 204. The primary compute unit 202 and the secondary compute unit 204 might be distinct processors with a communication channel between them, or some other structure. As illustrated, the primary compute unit 202 executes a system monitor AI 210, a trajectory planner AI 212, and stores sensor data 214, and the secondary compute unit 204 executes a system monitor 220, a trajectory manager process ("TMP") 222, and a safety/perception free corridor checker 224.

The system monitor AI 210 receives data such as may be included in messages transmitted from the system monitor 220 relating to status of various components of a monitor of an autonomous vehicle. Examples might include power systems, tire systems, environmental sensor systems, battery monitors, etc. The system monitor 220 might also receive messages from actuator systems relating to status and operation of those actuator systems. The system monitor AI 210 might receive data messages from other sources as well. When operating, the system monitor AI 210 may process those inputs to determine a system monitor AI output, such as a trajectory type request message sent to the system monitor 220. As an example, the system monitor AI 210 might determine that a nominal trajectory is the type of trajectory to be using or that an emergency stop type or a stopping type trajectory in which the autonomous vehicle comes to a stop due to some anomaly or other than nominal condition. The system monitor 220 may output actuator diagnostics messages.

The trajectory planner AI 212 considers various states, conditions, and/or inputs and generates one or more trajectories. A trajectory might be represented by a trajectory data record passed in a trajectory data message. A trajectory data record might include a timestamp indicating when the trajectory was created, details of direction, speed, inputs to actuators, etc. over a frame covered by the trajectory. For a given frame, the trajectory planner AI 212 might output one or more trajectories to a trajectory manager process ("TMP") 222 and might include a nominal trajectory and a contingent trajectory to be used if the nominal trajectory is not valid or contains a collision or when the TMP 222 determines that it is not to execute the nominal trajectory.

The trajectory planner AI 212 might receive warning messages from the TMP 222, such as messages indicating that the TMP 222 cannot process some trajectories.

The sensor data 214 may include point cloud data, such as vehicle surroundings represented by a point cloud, image data, radar data, and other sensor data and included in messages. The primary compute unit 202 can provide this sensor data 214 in messages to the safety/perception free corridor checker 224, which might use that information to provide a transformed (modified) trajectory with maximum deceleration to the TMP 222.

In addition to receiving messages from actuator systems relating to status and operation of those actuator systems and trajectory type request messages from the system monitor AI 210, the system monitor 220 might receive a system monitor release signal in received messages from a teleoperator system. Based on its inputs, the system monitor 220 might output a trajectory limit message to the TMP 222 limiting what trajectories the TMP 222 can select. The trajectory limit message might be an indication that the TMP 222 is not to execute a nominal (e.g., primary) trajectory and should execute one that results in the autonomous vehicle coming to a stationary position, or otherwise. The trajectory limit message might be an indication that the TMP 222 is to execute an emergency stop trajectory.

The system monitor 220 also can output a clearing message, such as a "Clear to Go" message, signaling to the TMP 222 that it can select the highest level trajectory again. This might be used where the TMP 222 used a lower level trajectory due to an earlier request by the system monitor 220 or because higher level trajectories were not valid and collision-free and the TMP 222 maintains that level until released by either the "Clear to Go" message or a system monitor release signal. In some instances, the system monitor release signal is required for a release. In some instances, the system monitor release signal is received by the system monitor 220 from a human operator using a teleoperator system after reviewing data from the vehicle. In some instances, the system monitor release signal is received directly by the TMP 222.

As explained elsewhere herein in further detail, the TMP 222 determines, from the trajectories it has available to it, the levels of the trajectories in a trajectory hierarchy, the level that the TMP 222 is capped at, and the validity and collision-free condition of the trajectories. The TMP 22 may evaluate the trajectories for validity and whether they will be collision free and select one of those trajectories, or one that it has stored, or one that it generated by modifying another trajectory (e.g., such as a collision avoidance trajectory or an E-stop trajectory). The validation process may include a punctuality test, a consistency test that includes or is separate from a staleness test, and a feasibility test 234, as will be described in greater detail below. In other examples, the TMP 222 may include some of or different combinations of validation and collision checks, or other checks. The TMP 222 then outputs a trajectory data message (otherwise referred to as a trajectory record) to a drive manager. Some of the processing of a trajectory might be performed by the TMP 222 and some might be performed by the drive manager.

The collision check 236 may include executing a free space checker, evaluating an object list based trajectory predictor, a processor using machine learning with a heatmap, Kalman filters, data associations of sensor data with object tracks determined by the AI engine 206, or other approaches. primary, contingent, and stored contingent trajectories, and/or modifications thereof might be checked at every period for possible collisions. Other trajectories might not need to be checked. For example, an emergency stop ("E-Stop") trajectory need not be repeatedly checked to determine if it will result in a collision, as that trajectory is likely the last resort and has a goal of slowing and likely already represents a last option for coming to a stop, with a locking of steering and applying maximum braking, and is likely only to be used when there are multiple system failures or having questionable status.

In some cases, the trajectory record may be an example of a validity signal, such as for a trajectory that is valid. In other cases, such as when a trajectory is determined not to be valid, a validity signal indicating such may be communicated to primary compute unit 202 or trajectory planner AI 212, as feedback. In other cases, the validity signal or value may be used internally to the TMP 222, such that upon generating the validity value or signal, the TMP 222 may then output a valid trajectory to primary compute unit 202 as a trajectory record, or may then select another trajectory for evaluation, in the case the tested trajectory is determined not to be valid. It should be appreciated, that as used throughout, validity value and validity signal may be used interchangeably.

In some aspects, the system monitor 220 may receive various inputs about the states of other systems on the autonomous vehicle. The inputs may include heartbeat signals from components that are expected to be active and are important for proper operation of the autonomous vehicle, failure notifications, reduce capability notifications, and so on. In some aspects, the system monitor 220 may send status messages to the system monitor AI 210, so that the system monitor AI 210 can process the status updates and determine any limitations on potential trajectories for the autonomous vehicle. In some cases, this may take the form of updating one or more capability limits for the vehicle, such as a maximum acceleration, deceleration, yaw, and other kinematic restraints on movement of the vehicle based on the status updates. The system monitor AI 210 may then determine if any trajectories types should be limited or restricted from selection, and indicate such in a trajectory type request message to the system monitor 210, which may then indicate any limitations to the TMP 222. In some cases, the trajectory type request may indicate the most permissive trajectory the vehicle can take safely, such that the TMP 22 can then verify the indicated trajectory or a more restrictive trajectory (e.g., a conflict avoidance trajectory or an emergency stop trajectory). In other aspects, the system monitor AI 210 may determine to what extent, e.g., by how much, to limit one or more capability values of the vehicle based on the inputs, whereby the system monitor 220 may update a set of capability limits for the vehicle. In this scenario, the TMP 222 may request the capability or feasibility limits from the system monitor 220 when validating one or more trajectories for feasibility, the determination of which may be based on the feasibility limits.

Figure 3:
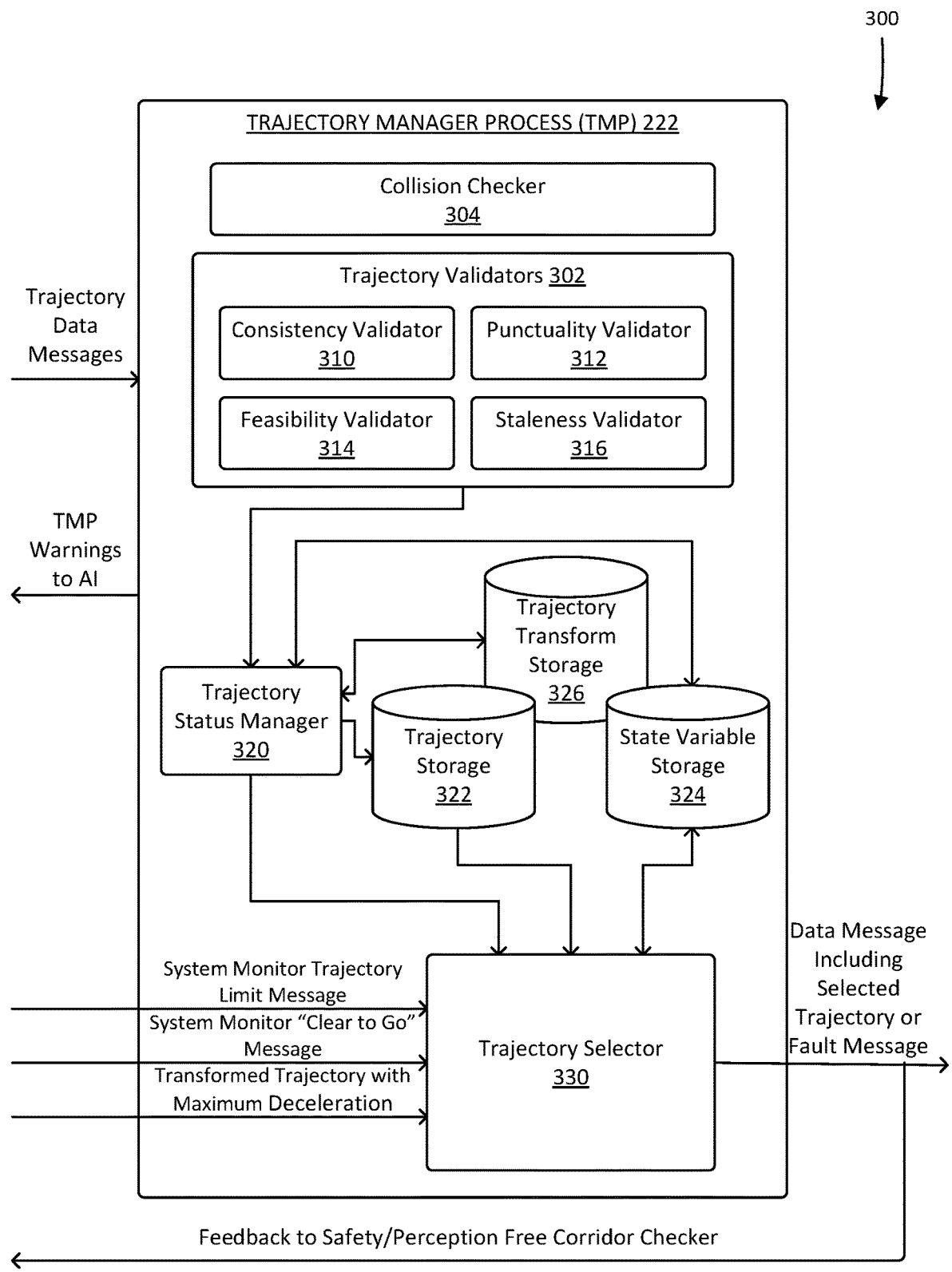
FIG. 3 is a block diagram illustrating elements of the trajectory manager process ("TMP") of FIG. 2 for validating and/or confirming trajectories received.

FIG. 3 is a block diagram 300 illustrating elements of the TMP 222 from FIG. 2 in greater detail, including a collision checker 304, trajectory validators 302, a trajectory status manager 320 and a trajectory selector 330. In some instances, the TMP 222 might include a distinct process and system for collision avoidance.

The trajectory validators 302 may include a consistency validator 310, a punctuality validator 312, a feasibility validator 314, and staleness validator 316, and potentially other validators (not shown), that might run other tests on a trajectory. The collision checker 304 checks a trajectory to determine whether it is collision-free. The results of the validity checks and collision checks may be provided to the trajectory status manager 320, which may store trajectories in trajectory storage 322 along with those results.

In the general case, the TMP 222 has available to it a plurality of trajectories, some of which might be received from an AI system of the primary compute unit 102, some of which were stored from prior frames, some of which are modified versions of received trajectories wherein a received trajectory is transformed and the transformation and/or the transformed trajectory are stored in a trajectory transform storage 326, and some might be relatively fixed trajectories (such as an emergency stop type trajectory). The AI-provided trajectories might be generated by the AI system based on sensor data, where the sensors might provide information about the road, the weather, surroundings, etc. The provided trajectories might include a trajectory that is expected to be a nominal trajectory and one or more contingent trajectory in case the nominal trajectory is not usable.

The trajectories stored in trajectory storage 322 may include a nominal trajectory and various contingent trajectories that may or may not terminate with the vehicle being stationary. A stored contingent trajectory might be a contingent trajectory from a previous frame that the TMP 222 received and stored, perhaps one that the TMP 222 received and chose not to use, using a received nominal trajectory instead. Another example is a transformed contingent type of trajectory that is derived from a received contingent trajectory, but modified to avoid a possible collision (i.e., a collision avoidance trajectory) possibly by adding iteratively increasing braking applied up to a maximum deceleration, adjusting by a small distance longitudinally, and/or making other minor changes to avoid a collision without totally abandoning a trajectory. Yet another example is a transformed stored contingent type of trajectory that is derived from a stored contingent trajectory, but modified in a similar manner. Yet another example is an emergency stop type of trajectory, with the maximum declaration applied immediately, instead of iteratively increasing braking, with locked steering.

The validity values and collision values could be determined from validity constraints and data about a prior or currently playing trajectory. Using those values, the trajectory selector 330 selects a trajectory, which may provide binary values and an indicator of which trajectory to select based on those binary values.

In some examples, a system monitor (such as system monitor 220 and/or system monitor AI 210 described above) may monitor health of components of the autonomous vehicle and from that issue requests for which of the available trajectories to use. For example, the system monitor may note a condition that while not safety related or something requiring an emergency stop, and then would indicate that the autonomous vehicle should use a contingent trajectory that brings the autonomous vehicle eventually to a stop. This request might be related to component/subcomponent health. In at least some examples, additional information (such as, but not limited to, weather, friction, etc.) may be used by the system monitor in making the determination of which trajectory to request.

In some aspects, the system monitor may obtain status updates from various subsystems of the vehicle, and update a set of feasibility limits, such as acceleration and deceleration limits both in the direction of primary movement (longitudinal) and lateral. The set of feasibility limits may be at first set at a default value, for example specified by component manufacturers of components of the vehicle, determined empirically, etc. These values may then be modified based on a determined effect of one or more operational status on the feasibility limits of the vehicle. As a non-limiting example, maximum acceleration/deceleration may be reduced by 10% in the event of detected inclement weather.

In one example, if the TMP 222 uses a contingent trajectory either because a higher trajectory failed a validity test or a collision check or because the system monitor indicated that a contingent trajectory should be used, the TMP 222 will record the level of trajectory it used into a state variable storage 324 and will use no higher-level trajectory until a release is signaled. The release might have different levels of release and those might be dependent on the severity of the anomaly that led to the use of a contingent trajectory. For example, if the anomaly was a minor power drop in one of the batteries but the power returned to normal on its own, that might be one level of anomaly and the system monitor AI system might be given authority to issue a release.

More generally, the system monitor sends a trajectory limit message to the TMP 222 indicating that it should not use a trajectory that has a level above a limit specified in the trajectory limit message, until a release is issued. For example, the trajectory limit message might indicate that no trajectory higher than the first contingent trajectory should be executed. In that case, the TMP 222 would pass on executing the nominal trajectory that is higher in the trajectory hierarchy.

Once the release is issued, the TMP 222 can then use the highest-level trajectory that passes its tests. For some anomalies, such as where all of the trajectories when checked were found to be invalid and the TMP 222 had to use the emergency stop trajectory, perhaps a higher level of release might be required. Such a higher level might require a human review of conditions and a human response clearing the anomaly.

The trajectory storage 322 might contain storage for the various trajectories that the trajectory selector 330 can select from and for each might contain a type indicator, data describing the trajectory, a validation value indicating whether the TMP 222 determined that the trajectory is valid, and a collision or collision free value indicating whether the TMP 222 determined that the trajectory is collision-free. In some instances, there might not be explicit storage for each of the data objects shown.

The trajectory selector 330 selects a trajectory, perhaps from trajectory storage 322, based on whether it is valid, collision-free, and possibly other conditions, as explained in more detail herein, and then sends a message with the proposed trajectory to a drive manager. The trajectory selector 330 takes into account the state variable in the state variable storage 324 that represents the "current level" of the TMP 222. As explained elsewhere herein, the TMP 222 evaluates trajectories and uses the one that is highest on a hierarchy unless its state indicates that it should not be above a specified level. An example hierarchy is from a nominal trajectory to an emergency stop trajectory. The specified level might be due to the system monitor 220 indicating a highest allowed level or due to the TMP 222 processing trajectories and finding that the highest level trajectories are not valid or contain collisions. In some instances, the current level of the TMP 222 remains the same from frame to frame if the trajectory at the current level is valid and collision-free and no external signals are received to lower the level, the current level of the TMP 222 goes down if the trajectory at the current level is not valid or is not collision-free or an external signal is received to lower the level. In such instances, the TMP 222 looks for a system monitor "Clear to Go" signal and/or a system monitor release signal.

Once the trajectory selector 330 selects a trajectory, it sends a data message to a drive manager consistent with the selected trajectory. Where no trajectory is available, or for other reasons, the trajectory selector 330 may send the drive manager a fault message and/or default to an "E-Stop." The trajectory selector 330 might also provide its output as feedback to the safety/perception free corridor checker 224.

In some situations, the trajectory status manager 320 will consider a trajectory and determine that it is valid, but not collision-free, and determine that a transform of the trajectory would be collision-free. For example, there might be a hierarchy, from highest to lowest, of a nominal trajectory, a first contingent trajectory, a stored contingent trajectory, a transformed contingent trajectory that is a transformation of a valid first contingent trajectory that has collisions into a collision-free trajectory, a transformed stored contingent trajectory that is a transformation of a valid stored contingent trajectory that has collisions into a collision-free trajectory, and an emergency stop trajectory. Examples of transformations include adding additional braking to a trajectory to make it collision-free. In such examples, the TMP 222 may continue to execute such a trajectory until terminus, or otherwise released in accordance with the techniques described herein.

The trajectory transform storage 326 might store the details of such transformations if needed in future frames. A transformed contingent trajectory might be stored as a complete trajectory and used in future frames. In that instance, if a first contingent trajectory is transformed into a transformed contingent trajectory and that transformed contingent trajectory is used, then in future frames that transformed contingent trajectory is reused until there is a release allowing the TMP 222 to use a higher level trajectory. If the transformed contingent trajectory is no longer valid and collision-free, a lower level trajectory would be used. In some instances, a separate trajectory transform storage is not used and the transformed trajectories are simply stored in the trajectory storage 322.

When the trajectory selector 330 receives the system monitor "Clear to Go" signal and/or the system monitor release signal, it can update the state variable storage 324 to indicate the new maximum allowed trajectory level. In a typical process, the system monitor clears the TMP 222 to use the highest-level trajectory available, but in some processes, the system monitor might partially clear the TMP 222 to a level above its current level, but not the to the highest level.

Figure 4:
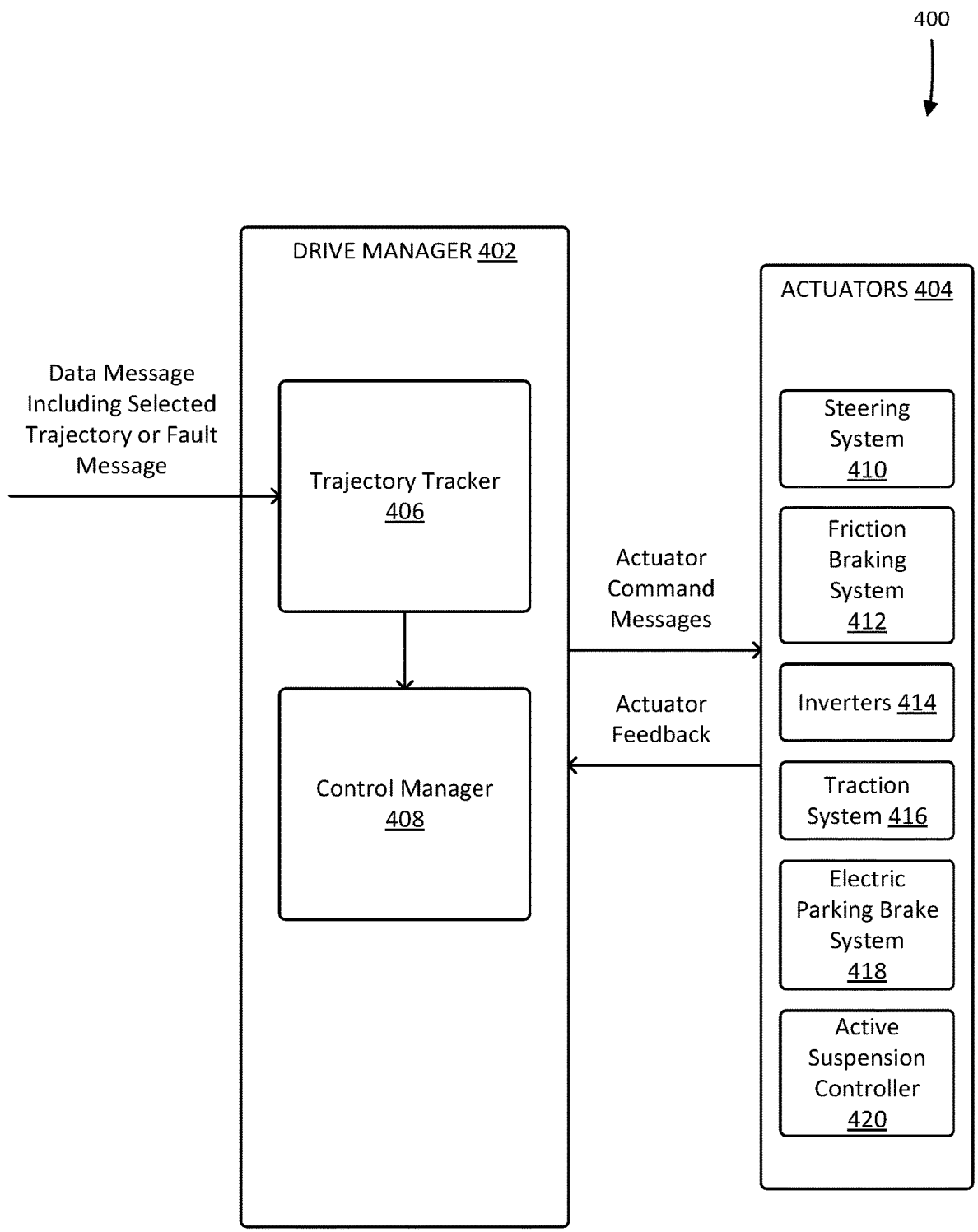
FIG. 4 is a block diagram illustrating elements of a drive manager that interfaces with actuator systems of an autonomous vehicle.

FIG. 4 is a block diagram 400 illustrating elements of a drive manager 402 that interfaces with actuators or actuator system 404 of an autonomous vehicle. As illustrated there, the drive manager 402 might include a trajectory tracker 406 that maintains a data structure containing a trajectory passed to the drive manager 402 from a trajectory selector such as the trajectory selector 330 illustrated in FIG. 3. The drive manager 402 might also include a control manager 408.

Examples of actuators in the actuator systems 404 might include a steering system 410, a friction braking system 412, inverters 414, a traction system 416, an electric parking brake system 418, and an active suspension controller 420. Each of these systems may have an impact on one or more feasibility limits of the vehicle, such that a reduced operating capacity may reduce the amount the vehicle may accelerate or decelerate in the direction of primary movement, and/or laterally.

In operation, the drive manager 402 might output actuator command messages to the actuator systems 404 and might receive feedback messages from the actuator systems 404. Such feedback messages may be used by the system monitor in determining a requested trajectory, as will be described in greater detail below.

Figure 5:
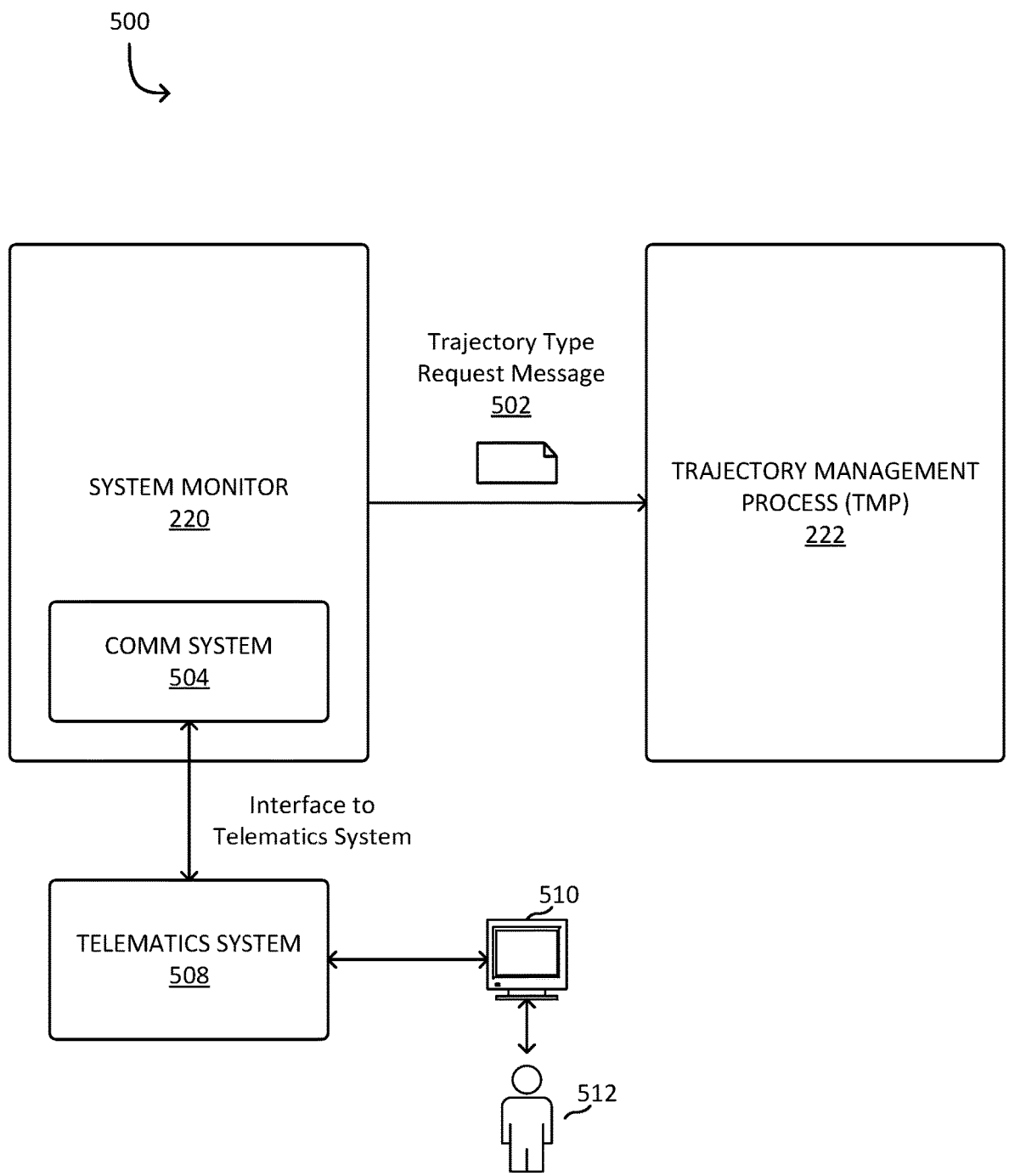
FIG. 5 is a block diagram illustrating an alternative view of a system monitor and a trajectory manager process ("TMP").

FIG. 5 is a block diagram illustrating an alternative view 500 of the system monitor 220 and the TMP 222. FIG. 5 does not necessarily show all the data structures that might be present and some of those shown might be logical data structures and/or remote or distributed data structures. As illustrated there, the system monitor 220 might have a communications system 504 that interfaces to a telematics system 508 that is remote from the autonomous vehicle and can present information on a display 510 used by a telematics operator 512 to consider information and provide signals and inputs to the autonomous vehicle.

The requirements for which kind of release signal is sufficient to release the TMP to a higher level trajectory use might require that for some levels, the release signal can only come from human interaction. The human interaction might be from a remote telematics operator using a system that provides telematics data to the human. In at least some examples, such a telematics operator may comprise a more powerful machine capable of running more sophisticated diagnostics to issue the clearance message.

As one example, the system monitor 220 might find some values or conditions to be out of normal operating range and send a query to the telematics system 508 while also sending a trajectory type request message 502 to the TMP 222 requesting a contingent trajectory that leads eventually to stopping and remaining in a stationary position after sensing an anomalous condition in the autonomous vehicle or the environment. In some instances, the anomalous condition might be so severe that the autonomous vehicle should not start moving once brought to a stationary position until the telematics operator 512 has assessed the conditions and determined that the anomalous condition is sufficiently cleared.

For example, if the system monitor 220 detects a fault that should lead to the autonomous vehicle stopping for safety reasons and issues a trajectory type request to the TMP 222, but then the telematics operator 512 determines that the fault is no longer present or is not an actionable fault, the telematics operator 512 might direct the telematics system 508 to send a system monitor release signal (e.g., a "release to Go" message) to the system monitor 220. This mechanism creates a situation where, once the autonomous vehicle is stopped, the system monitor 220 would be telling the TMP 222 to keep it stopped, until the system monitor 220 receives a "release to Go" message.

Figure 6:
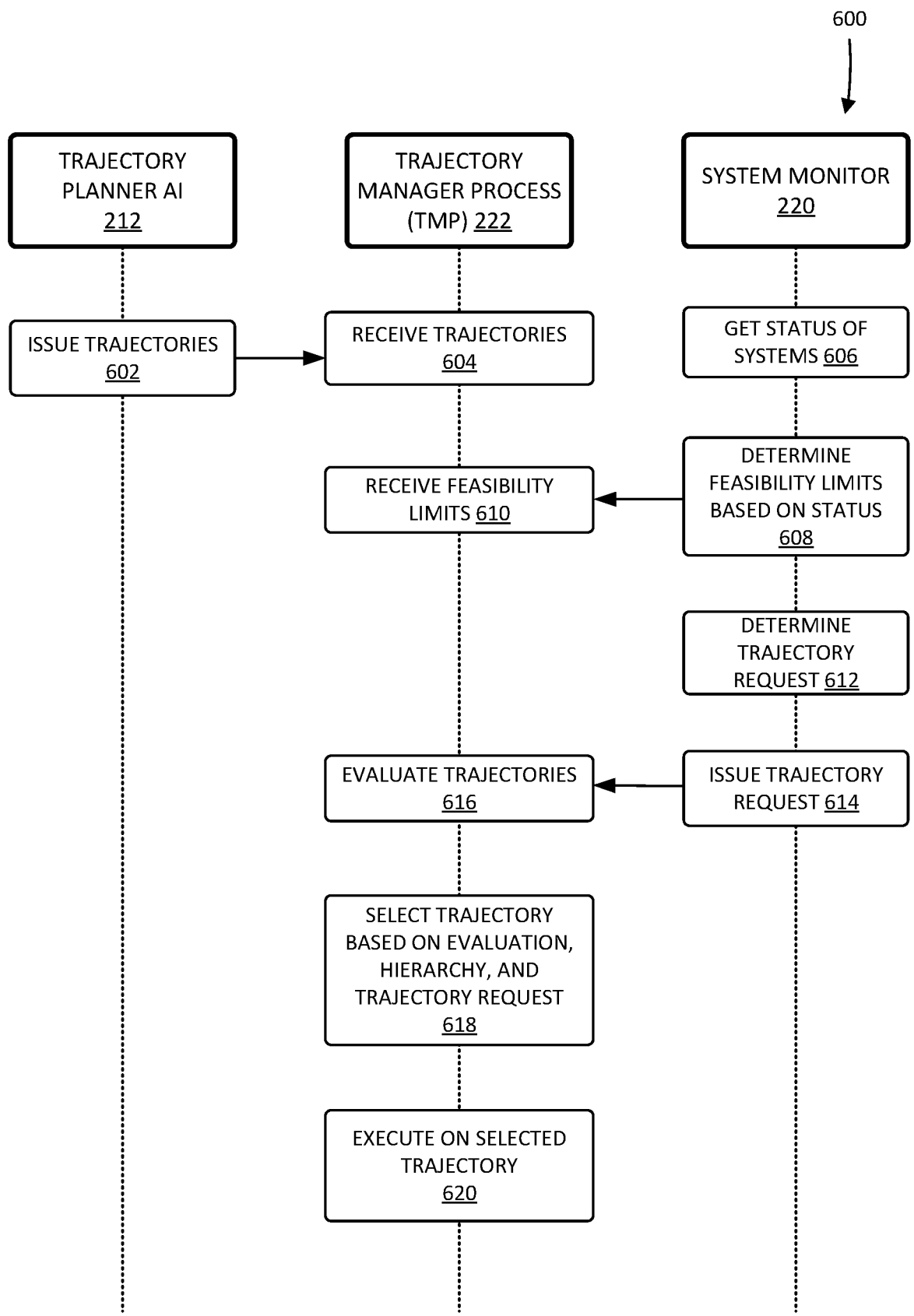
FIG. 6 is a diagram illustrating an example interaction between a trajectory planner, a trajectory manager process (TMP), and a system monitor of FIG. 2.

FIG. 6 is a diagram 600 illustrating an example interaction between a trajectory planner AI 212 of a primary compute unit 202, a TMP 222 of a secondary compute unit 204, and a system monitor 220, as described in greater detail above with respect to FIGS. 2 and 3. As described above, system monitor 220 may operate in conjunction with system monitor AI 210 to update one or more feasibility limits and inform TMP 222 of the updated feasibility limits to enable validation of trajectories based on the updated feasibility limits. In other examples, system monitor 220 may include the functionality of system monitor AI 210, and reside in either of the primary compute or secondary compute units 202, 204. In the illustrated interaction, the trajectory planner AI 212 may determine one or more trajectories, and the TMP 222 may select one of those trajectories based on validity checks, collision-free checks, and/or a request from the system monitor 220 requesting a particular type or types of trajectories.

In the example process flow shown, the trajectory planner AI 212 may issue a number of trajectories at operation 602, which may include one or more of different types of trajectories, such as a primary trajectory and a secondary trajectory. For example, the trajectory planner AI 212 might issue, at one interval or for one time period, (a) a primary trajectory that continues the vehicle on its mission (and/or a set of primary trajectories which, when executed by the vehicle, would cause the vehicle to traverse to its destination), and (b) a secondary (or contingent) trajectory that stops the vehicle at some point in time due to an anomalous condition.

At operation 604, the TMP 222 may receive the trajectories from the trajectory planner AI 212. In some cases, the TMP 222 may access other trajectories available to it, for example, not necessarily received from the trajectory planner AI 212 in the current time frame, such as a stored secondary trajectory or even at least in part determined by the TMP 222. Examples include a stored secondary type of a trajectory that is a secondary trajectory from a previous timestamp received and stored (e.g., after verifying), perhaps one that the TMP 222 received and chose not to use, using another trajectory instead. Another example is a collision avoidance trajectory or modified or transformed contingent trajectory based on another trajectory, such as a secondary trajectory or stored secondary trajectory. A transformed contingent trajectory may be derived from a received secondary trajectory, but modified to avoid a possible collision, for example, by adding iteratively increasing braking applied up to a maximum deceleration, adjusting by a small distance longitudinally, or via other minor changes to avoid a collision without totally abandoning a trajectory. Another example is an E-Stop type of trajectory, with the maximum declaration applied immediately, instead of iteratively increasing braking, with locked steering.

In some cases, concurrently with the TMP 222 receiving trajectories at operation 604, or other operations of the TMP 222, or at a different time, the system monitor 220 may receive one or more status updates for systems or subsystems of the vehicle, at operation 606, such as from or associated with one or more systems described above in reference to FIG. 4. These status updates may include, for example, periodic updates or heartbeat operations of one or more subsystems, indicating that they are fully functional. The status updates may also indicate whether a system is operating at a reduced capacity, has failed, and/or other information relevant to the operation of the vehicle.

Based on these status updates, the system monitor 220 may determine or update an existing set of feasibility or capability limits for the vehicle, at operation 608 and send them to the TMP 222, whereupon the TMP 222 may receive the feasibility limits at operation 610 and use them in evaluating trajectories, at operation 616. This may include determining an amount to update one or more feasibility limits based on a status of the one or more subsystems. In some examples, operational status of various subsystems of the vehicle may be determined as a matter of degree (e.g., via percentages, etc.). Different ranges of percentages of operation for various subsystems may be correlated to capability limits of the vehicle. For example, tire pressure of four tires above 35 PSI may correlate to 100% of longitudinal acceleration, deceleration, and lateral acceleration. A tire pressure of 25 to 35 PSI may correlate to 75% of one or more of those capabilities and so on. Various subsystems of the vehicle may be monitored and a subsequent effect on one or more operational limits may then be determined. The effect, which may be represented by a change in in the operational limit, may be determined empirically, set from a component or vehicle manufacturer, or via other means.

In some aspects the system monitor 220 may, in some aspects, check with a telematics system if necessary, and determine what type of trajectory to request, at operation 612. This may be in the form of determining a highest level trajectory that the system monitor will permit the vehicle to select. The system monitor 220 may then issue a trajectory request to the TMP 222, at operation 614, which can be in the form of an inter-process message. It should be appreciated, that in some cases, the TMP 222 may not expect or even need input from the system monitor 220 to make a trajectory selection. For example, the TMP 222 may receive system or status updates directly or through another entity or system, and so on.

At operation 616, the TMP 222 may evaluate the received trajectories, such as by performing one or more validity checks and/or a collision check. In some aspects, operation 606 may include performing one or more of a punctuality test, a consistency test, a staleness check, a feasibility test, and/or a collision test for each trajectory received at operation 604, as will be described in greater detail below. In some cases, the one or more tests may be performed by one or more of the trajectory validators 302, such as the consistency validator 310, punctuality validator 314, feasibility validator 314, and/or the staleness validator 316, as described above in reference to FIG. 3.

In some cases, the TMP 222 may evaluate trajectories at operation 616 further based on a trajectory request, if any is determined or sent, from the system monitor 220. In some aspects, the TMP 222 may select a trajectory at operation 618 based on the trajectory request, such that the selection may be limited by the highest trajectory indicated in the trajectory request. The TMP 222 may execute or instruct other subsystems of the vehicle, such as the primary compute unit 202, to execute the trajectory, at operation 620.

In some aspects, TMP 222 may wait until it receives a trajectory request from the system monitor 220, to evaluate the trajectories, at operation 618. In other aspects, the TMP 222 may not wait for a trajectory request from the system monitor 220 before selecting a trajectory at operation 620.

In some cases, TMP 222 may evaluate received trajectories for validity and whether the trajectory is collision free. In at least some examples, the results may be represented by binary values (e.g., true or false or 1 and 0), but it is contemplated herein that any set of values or keying system may be used to a similar effect including, without limitation, uncertainty information, error bars, and the like. As described through this disclosure, the validity signal or value may represent a combined score for any number of different tests or operations, such as a punctuality check, a consistency check, a staleness check, a feasibility check, or other tests that may be useful in ensure safe operation of the vehicle or device. In some cases, a trajectory must pass all of the validity tests to be assigned a true or positive value.

In some aspects, selecting and verifying a trajectory using predefined trajectory selections, may provide for a number of advantages and/or benefits. For example, greater consistency in trajectory selection may be achieved through the use of a more comprehensive set of trajectory selections, when compared to a rule based approach. In yet some instances the time to verify a trajectory as, for example valid and collision free, may be reduced by using a predefined set of values, such as a table or other data structure, over a rules based approach.

Figure 7:
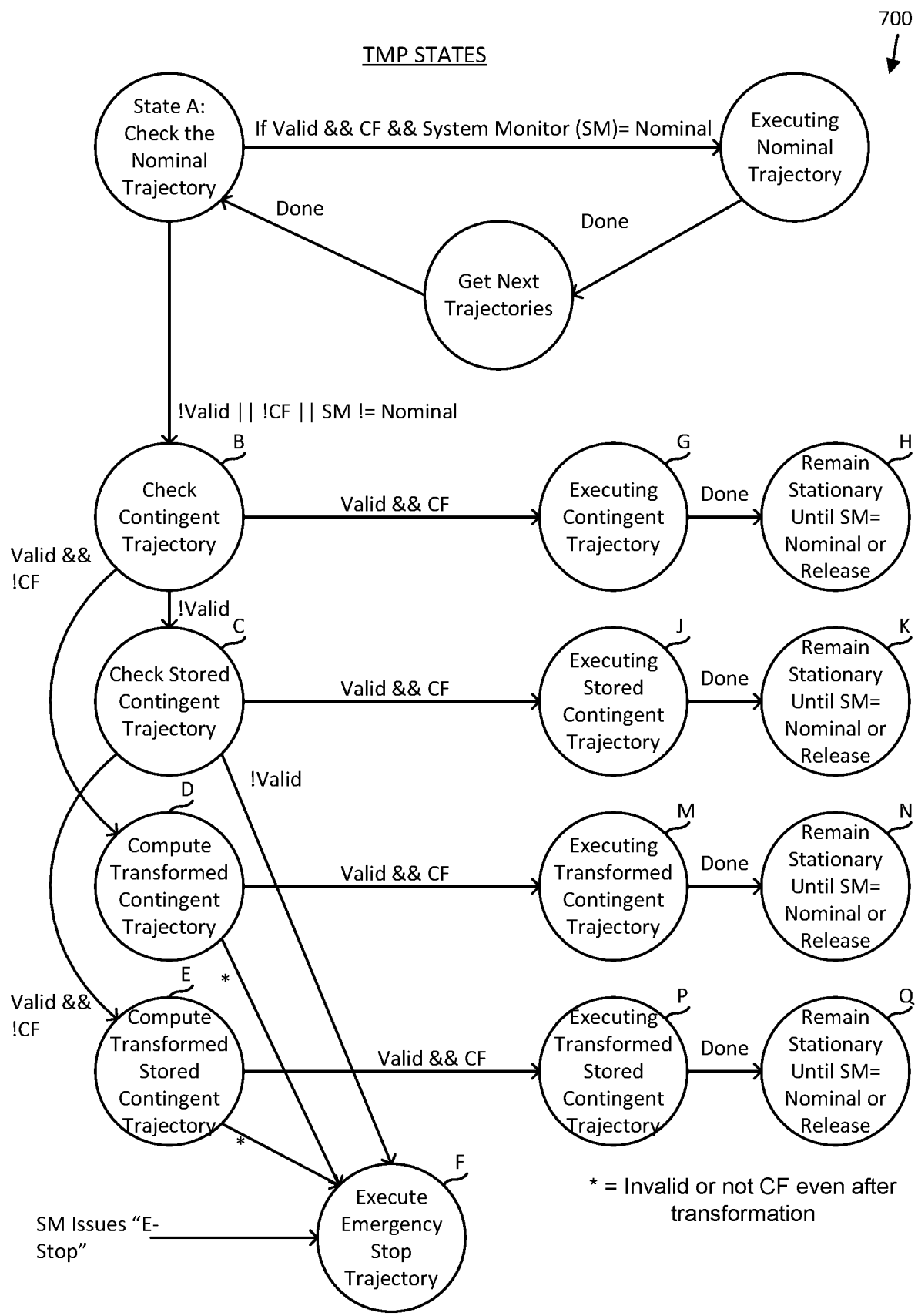
FIG. 7 is a state diagram as might be implemented in a TMP that is processing trajectories and selecting a trajectory and/or modifying a trajectory.

FIG. 7 is a state diagram as might be implemented in a TMP, such as TMP 222 described above, that is processing trajectories and selecting a trajectory and/or modifying a trajectory, such as described above at operation 618. Such a state diagram may illustrate how a system (such as an autonomous vehicle system) may move from one operating mode (e.g., a nominal mode) to a contingent mode or back-up mode. The TMP may receive one or more trajectories for a frame and/or a request from a system monitor, such as system monitor 220, indicating a requested trajectory for the frame. Either of these might be synchronously received and/or asynchronously received.

The operating mode may have a trajectory associated with that mode. For example, a nominal mode might have a trajectory that moves the system along a path, such as moving an autonomous vehicle along a path from a starting location to a destination while observing constraints related to the road, the autonomous vehicle, and/or the passengers, whereas a contingent mode might have a trajectory associated with it that moves the autonomous vehicle along a path that brings the autonomous vehicle to a stop while avoiding collisions.

In the state diagram of FIG. 7, the states correspond to operating modes and the TMP may store a state variable indicating the state. Alternatively, the TMP may derive its state from other information. As described herein, the TMP may have available to it a number of trajectories at any given frame.

When in a first state (shown as "State A" in FIG. 7), the TMP validates a received nominal trajectory, which might be referred to as a primary trajectory, against one or more validation tests, such as those illustrated in FIG. 3. From State A, if the trajectory is valid and collision-free and the system monitor is allowing for a nominal trajectory (such as by not sending a trajectory limit message or indicating that the TMP is cleared to use any trajectory), the TMP will process that trajectory and set its state variable to indicate that state. The TMP may process the trajectory by executing it or passing it to another subsystem for execution. In a next frame, the TMP may obtain trajectories for that next frame and return to State A.

The TMP may receive more than one nominal trajectory along with contingent trajectories and possibly also one or more trajectory that the TMP generates itself, such as by modifying a received trajectory. In examples described herein, the TMP may receive only one nominal trajectory. The TMP may check the other trajectories to determine if they are valid and collision-free each frame or, in some instances, may only check other trajectories if the TMP determines that it might use such trajectories, such as where a trajectory higher in the hierarchy of trajectories is not valid or is not collision-free. The nominal trajectory might involve stopping, such as where under normal conditions a vehicle comes to a stop at a stop sign, to embark or disembark passengers, etc.

Figure 8:
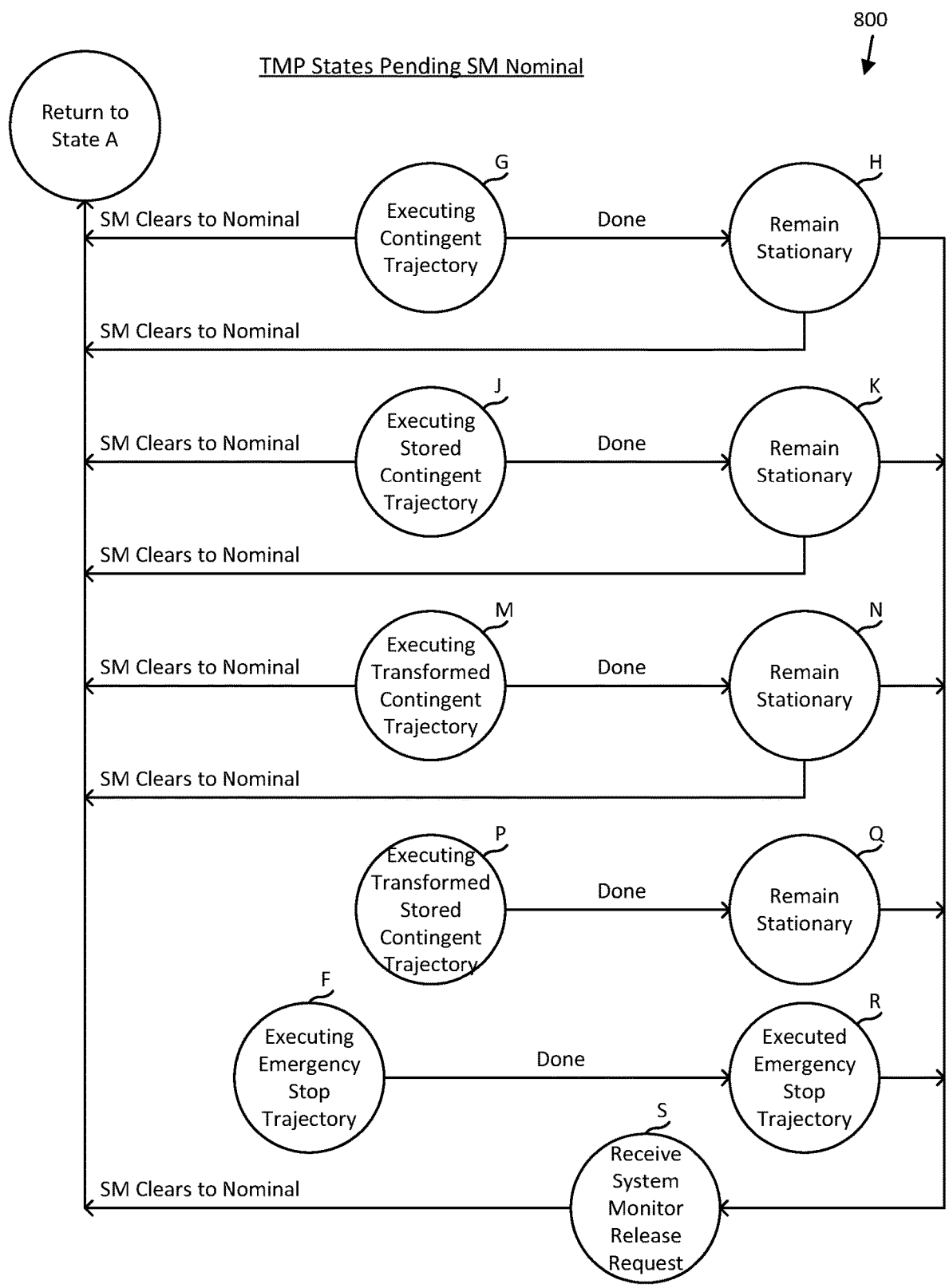
FIG. 8 is a state diagram as might be implemented in a TMP representing states of the TMP upon selecting a trajectory other than a nominal trajectory representing nominal operation.

From State A, if any of those conditions are not satisfied, e.g., the TMP determines that the nominal trajectory is not valid, or it is not collision-free, or the system monitor has indicated that the TMP should not use the nominal trajectory (shown in FIG. 7 as the system monitor signaling anything other than "Clear to Go"), then the TMP transitions to State B, where it checks a received first contingent trajectory for validity and collisions. If the first contingent trajectory is both valid and collision-free, the TMP moves to State G, executes that first contingent trajectory (again by either executing it or passing it to another subsystem for execution) and when done, moves to State H. In this example, State H is a state where the autonomous vehicle is stationary. As is illustrated in FIG. 8, the TMP maintains this state until it receives a "Clear to Go" signal from the system monitor and/or receives a system monitor release request from a human-monitored system, such as a telematics system.

In State B, if the TMP determines that the first contingent trajectory is not valid, the TMP transitions to State C and tries a second contingent trajectory, which might be a stored contingent trajectory from a prior frame. In State B, if the TMP determines that the first contingent trajectory is valid but is not collision-free, the TMP transitions to State D and tries to modify the first contingent trajectory by transforming it into a third contingent trajectory.

In State C, the TMP checks the second contingent trajectory for validity and collisions. If the second contingent trajectory is both valid and collision-free, the TMP moves to State J, executes that second contingent trajectory (by executing it or passing it for execution) and when done, moves to State K. In this example, State K is also a state where the autonomous vehicle is stationary. The TMP also maintains a state variable indicative of its allowed level in the hierarchy, so once it reached State C, in a future frame it will skip State A and State B until a release is received.

In State C, if the TMP determines that the second contingent trajectory is not valid, the TMP transitions to State F and executes an emergency stop trajectory, which should be rare as it requires that the nominal trajectory not be executable and that both contingent trajectories are invalid.

In State D, the TMP checks the third contingent trajectory for validity and collisions. If the third contingent trajectory is both valid and collision-free, the TMP moves to State M, executes that third contingent trajectory (by executing it or passing it for execution) and when done, moves to State N. In this example, State N is also a state where the autonomous vehicle is stationary. The TMP also maintains a state variable indicative of its allowed level in the hierarchy, so once it reached State D, in a future frame it will skip States A, B and C until a release is received.

In State E, the TMP checks the fourth contingent trajectory for validity and collisions. If the fourth contingent trajectory is both valid and collision-free, the TMP moves to State P, executes that fourth contingent trajectory (by executing it or passing it for execution) and when done, moves to State Q. In this example, State P is also a state where the autonomous vehicle is stationary. The TMP also maintains a state variable indicative of its allowed level in the hierarchy, so once it reached State E, in a future frame it will skip States A through D until a release is received.

In States D or E, if the TMP determines that it is not possible to transform the contingent trajectory into a transformed trajectory that is collision-free (or something happens to make it no longer valid or the transformation makes it invalid), the TMP moves to State F. Also, if the system monitor, perhaps in response to detecting a systems error, mechanical error, electrical error, etc., sends a message to the TMP to execute an emergency stop, the TMP moves to State F.

Thus, as explained with reference to FIG. 7, the TMP can identify a state to be in and a trajectory to execute. As each of the contingent trajectories is likely in response to an error or an unexpected condition, the TMP would not resume nominal operation until receiving a release signal.

FIG. 8 is a state diagram as might be implemented in a TMP representing states of the TMP upon selecting a trajectory other than the nominal trajectory. Examples of states where the TMP is executing some type of contingent trajectory include State G (where the TMP executes a first contingent trajectory received from a trajectory planner AI that is a valid and collision-free trajectory), State J (where the TMP executes a stored contingent trajectory previously received from the trajectory planner AI that is a valid and collision-free trajectory), State M (where the TMP executes a transformed version of the first contingent trajectory to make it collision-free), State P (where the TMP executes a transformed version of the stored contingent trajectory to make it collision-free), and State F (where the TMP executes an emergency stop trajectory).

In states other than State P and State F, it might be that the TMP can return to State A if the system monitor requests a nominal type trajectory once the autonomous vehicle is stationary (or, in some instances, has a nonzero velocity, but that velocity is less than or equal to a threshold velocity), a release signal received from the telematics system is required to have a transition to State A. For example, in State F, as the TMP executed an emergency stop, and transitioned to a stationary state, State R, the TMP would remain in that state, and the autonomous vehicle would remain stationary, until in State S, the TMP receives a release request issued by a human operator.

As illustrated in FIG. 8, there are some states in which the system monitor's clearing of an anomalous condition could result in the autonomous vehicle moving again, or exiting from a state that would lead to the autonomous vehicle stopping, while there are other states in which a release signal is received from the telematics system is required in order to result in the autonomous vehicle moving again.

In a specific instance, the nominal trajectory is labeled a primary trajectory, the first contingent trajectory is labelled a secondary trajectory, the second contingent trajectory is a stored contingent trajectory, the third contingent trajectory is transformation of the first contingent trajectory, while the fourth contingent trajectory is transformation of the second contingent trajectory, but other possibilities for nominal and contingent trajectories are possible. It is not required that the nominal trajectory have the vehicle continue moving and it is not required that all of the contingent trajectories have the vehicle coming to a stop.

In a more general instance, there is a nominal mode where a nominal trajectory is being executed, a hierarchy of contingent trajectories where a highest level trajectory that is valid and collision-free is executed and the TMP will remain at that level until released. In the general instance, the levels might be such that higher levels can be released by an automated system and lower levels require human review and intervention to release to a level higher than the level of the trajectory that ultimately was executed.

In some instances, the release from the system monitor might not be a complete and unconditional release (e.g., allowing the TMP back to the highest level and State A). Instead, the system monitor release might be to some level higher than a current TMP level, but less than the highest level.

While FIG. 8 illustrates that the system monitor can clear from States H, K, and N, in some instances, the TMP might be programmed to allow for a system monitor release from States G, J, and M—states in which the autonomous vehicle is moving, but require more than the system monitor release from States H, K, and N. Other variations should be apparent upon review of the figures and the descriptions herein. Further, though illustrated as the system monitor clearing to the primary trajectory, the system monitor may clear to any other level, as would be reflected in the state diagram described with respect to FIG. 7.

Figure 9:
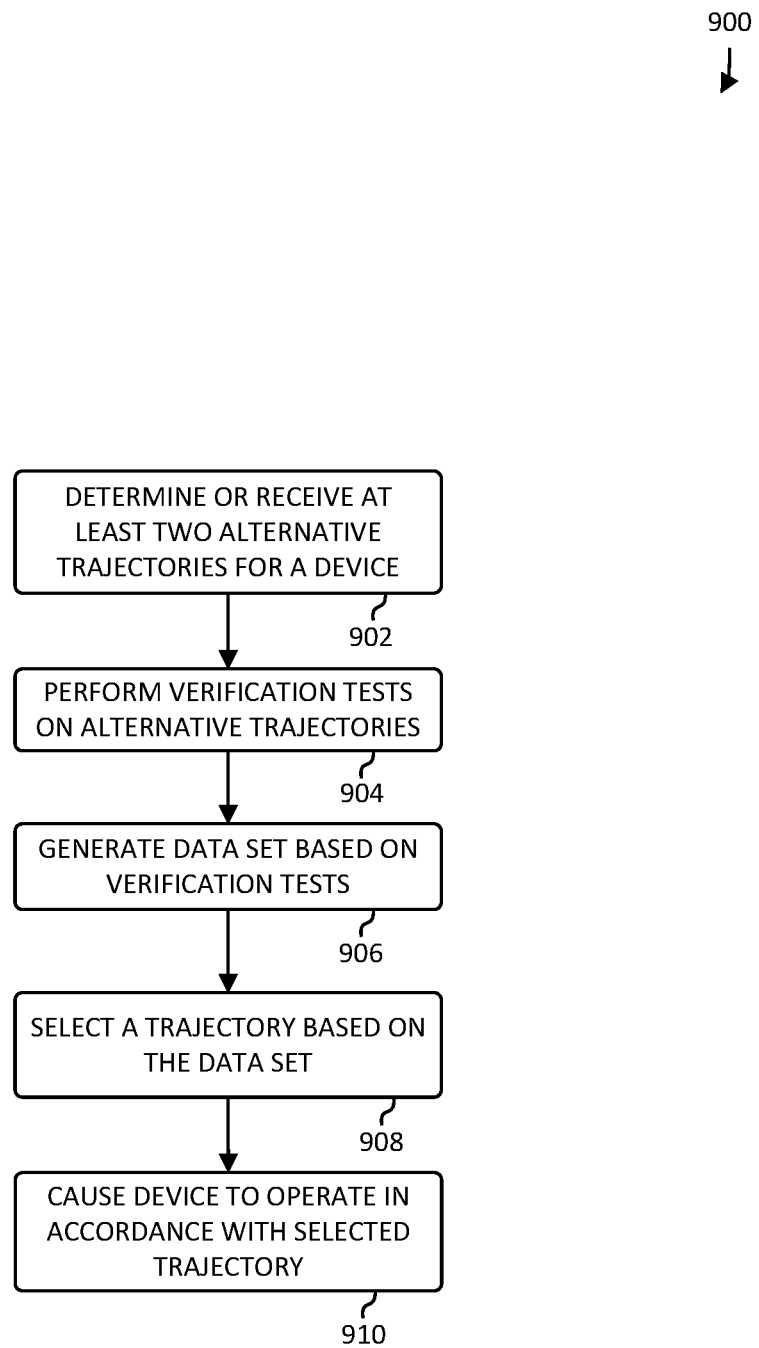
FIG. 9 illustrates an example process for verifying alternative trajectories and selecting a trajectory based on the verification.

FIG. 9 illustrates an example process 900 for verifying alternative trajectories and selecting a trajectory based on the verification, which may be performed by an autonomous vehicle or device, as described above. In some examples, process 900 may be performed by planning subsystem 1628, as described below in reference to FIG. 16, and/or by TMP 222 and/or system monitor 220 described above.

Process 900 may begin with operation 902, in which at least two alternative trajectories for a device may be determined or received. In some cases, operation 902 may be performed by TMP 222.

Next, at operation 904, one or more verification tests or evaluations may be performed on the alternative trajectories, for example, by TMP 222. The verification tests may include one or more of a validity test, such as a punctuality, consistency, staleness and/or feasibility test, as will be described in greater detail below, and/or a collision test.

Next, at operation 906, a data set may be generated based on the verification tests. In some cases, the TMP 222 may generate the data set. The data set may include the results of the verification tests performed on the alternative trajectories.

Based on the data set, a trajectory may be selected at operation 908. Operation 908 may including determining, based at least in part on the validity and/or collision checks, a selected trajectory. In at least some examples, such a selected trajectory may comprise a highest level trajectory which is both collision free and valid, such as according to state diagrams 700 and 800 described above in reference to FIGS. 7 and 8. In various examples, where no trajectory is valid and collision free, an emergency stop (e-stop) may be selected.

Next, at operation 910, the device may be instructed or caused to operate in accordance with the selected trajectory. Operation 910 may include the TMP 222 sending the selected trajectory to primary compute unit 202, drive manager 402 and/or actuators 404 or other subsystem of the device or vehicle, to cause the device to follow the selected trajectory.

Figure 10:
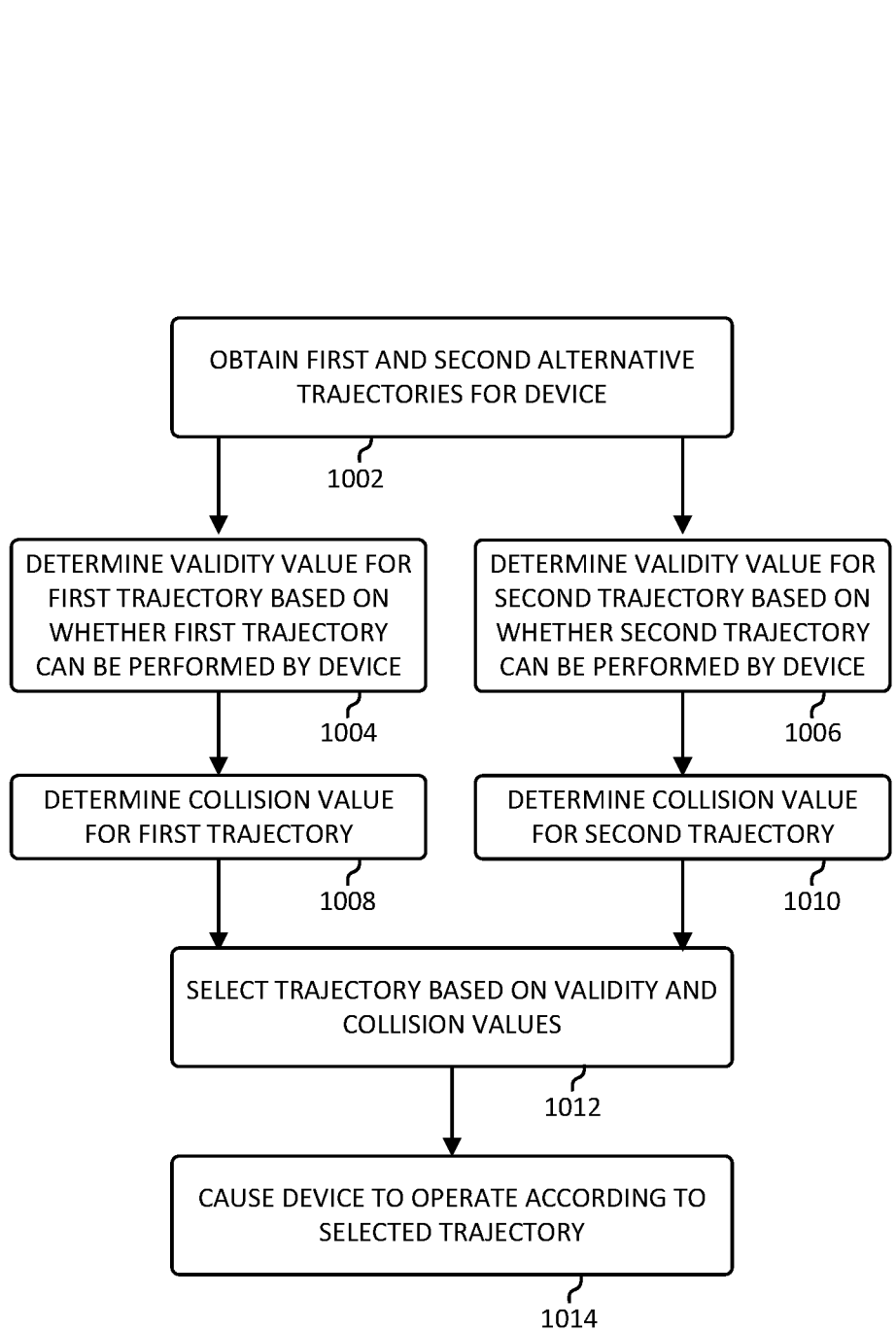
FIG. 10 illustrates another example process for verifying alternative trajectories and selecting a trajectory based on the verification.

FIG. 10 illustrates another example process 1000 for verifying alternative trajectories and selecting a trajectory based on the verification, which may be performed by an autonomous vehicle or device, as described above. In some examples, process 1000 may be performed by planning subsystem 1628, as described below in reference to FIG. 16, and/or by TMP 222 and/or system monitor 220 described above.

Process 1000 may begin with operation 1002, in which first and second alternative trajectories for a device may be obtained. In some cases, where the device is an autonomous vehicle, the first and second alternative trajectories may be obtained from a trajectory planner AI 212 described above, or other trajectory generation computing device or process.

Next, at operations 1004 and 1006, a validity value may be determined for each of the first and second alternative trajectories. In some aspects, the validity values determined may be binary values, to ease or reduce complexity of analysis and/or comparison and increase computational efficiency. In other aspects, the validity values may include more than two values, to increase accuracy of trajectory selection, for example. Operations 1004 and 1006 may include performing any of a number of separate or interconnected tests or evaluations. For example, validity may be determined by performing a punctuality check, to ensure that the trajectory has been received within a certain time period, a consistency check to ensure that a future trajectory is consistent or congruous with or within defined physical parameters of the current trajectory such that the trajectory aligns with a current trajectory the device is on (e.g., steering to the trajectory), feasibility to ensure the vehicle is physically capable of navigating to and on the trajectory (e.g., within velocity acceleration limits), staleness to ensure that the trajectory was generated within a certain period of time, and/or other validity tests. In some aspects, operations 1004 and 1006 may be performed by consistency validator 310, punctuality validator 312, feasibility validator 314, and/or staleness validator 316 of TMP 222 described above.

Next at operation 1008 and 1010, a collision value may be determined for each of the first and second trajectories. In some cases, operations 1008 and 1010 may be performed by the TMP 222 and/or a collision checker 304. In some aspects, operations 1008 and 1010 may include the TMP 222 rejecting trajectories that it determines would contain imminent collisions with agents or objects. Operations 1008 and 1010 may include executing a free space checker, evaluating an object list based trajectory predictor, a processor using machine learning with a heatmap, or other approaches. In some cases, one or more of operations 1004 and 1008 may be performed in tandem with, concurrently, or even substantially simultaneously (e.g., within technical tolerances) with operations 1006 and 1010.

Next, at operation 1012, a trajectory may be selected, based on the validity and collision values determined in prior operations, such as by selecting the highest priority trajectory which is both collision free and valid according state diagrams 700 and 800 described above. In some aspects, operation 1012 may include comparing a data set, including the validity and collision values of the at least two alternative trajectories.

Next, at operation 1014, the device may be instructed or caused to operate in accordance with the selected trajectory. Operation 1014 may include the TMP 222 sending the selected trajectory to primary compute unit 202, drive manager 402 and/or actuators 404 or other subsystem of the device or vehicle, to cause the device to follow the selected trajectory.

Figure 11:
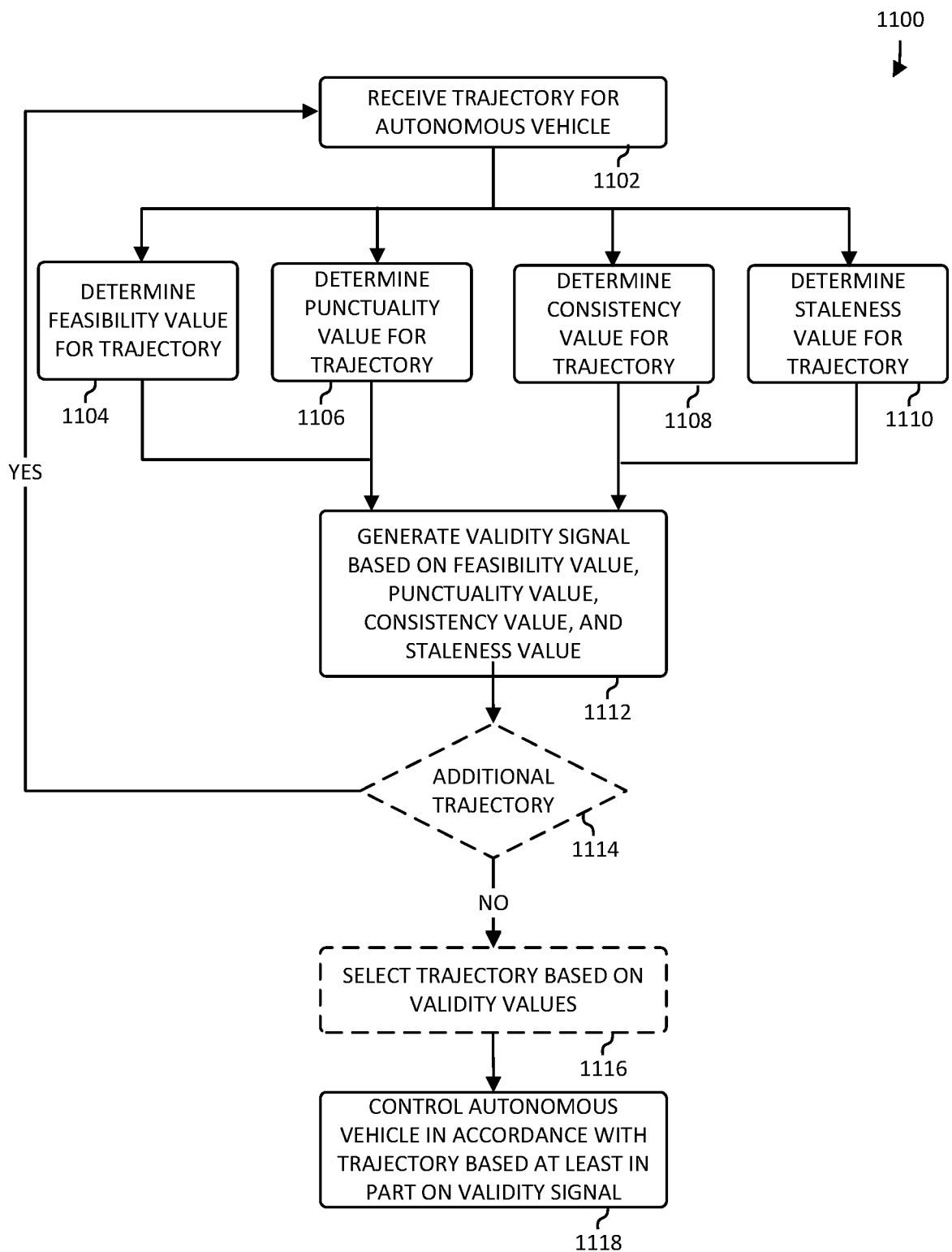
FIG. 11 illustrates an example process for validating and selecting a trajectory.

FIG. 11 illustrates an example process 1100 for validating a trajectory, which may be performed by an autonomous vehicle or device, as described above. In some examples, process 1100 may be performed by planning subsystem 1628, as described below in reference to FIG. 16, and/or by TMP 222 and/or system monitor 220 described above.

Process 1100 may begin with operation 1102, in which a trajectory for an autonomous vehicle may be received. Operation 1102 may be performed by TMP 222 such as from trajectory planning AI 212 or other component or subsystem of an autonomous vehicle.

At operation 1104, a feasibility value may be determined for the trajectory. In some aspects, operation 1104 may be performed by the feasibility validator 314. The feasibility value may be determined based on a number of operational characteristics of the vehicle, as will be described in greater detail below in reference to FIGS. 14 and 15. In some example, the feasibility value may relate to whether the vehicle is physically capable of navigating to the potential trajectory, such as based on a maximum velocity of vehicle, a max deceleration in one or more directions, a maximum acceleration on one or more directions, a maximum resultant acceleration, or a number of other characteristics (turning radius, and/or other kinematic constraints). In some cases, the feasibility values used to evaluate the potential trajectory may be updated based on current operation conditions of the vehicle and subsystems thereof, or may be defined via external or objective metrics.

At operation 1106, a punctuality value for the trajectory may be determined. In some aspects, operation 1106 may be performed by the punctuality validator 312. In some cases, punctuality may be defined by how much time has elapsed since a previous trajectory was received, for example, by TMP 222. In some cases, operation 806 may include determining a second temporal difference between a time the trajectory was received and a time a previous trajectory was received.

Punctuality may be used as an indicator of whether various subsystems of the vehicle or device are working properly and within expected boundaries. For example, if new trajectories are typically received within a certain time period or at a certain frequency, a trajectory received outside of that time period or not at all may indicate a failure or issue with one or more systems of the autonomous vehicle. As such, using punctuality and other similar checks as indicators of operational status of the vehicle may be particularly useful in improving the safety in operation of the vehicle. In some cases, one or more time periods or limits may be defined that indicate whether a received trajectory is punctual. These limits may be universal to all trajectories, or may be set according to whether a trajectory is a primary trajectory or a contingent trajectory.

In some aspects, punctuality may be defined in terms of a number of missed trajectories. The number of missed trajectories may be according to the passage of a time interval in which trajectories are typically received, such as every tenth or one hundredth of a second. In some cases, one missed trajectory may indicate a malfunction or other condition that results in the trajectory being invalid. In other cases, two or a different number of missed trajectories may indicate an issue, causing the punctuality test to fail. In yet some cases, a different time period or number of missed trajectories may be set for different types of trajectories (e.g., primary, contingent, E-stop, etc.). For example, two or less trajectories may be missed for a primary trajectory and the trajectory still determined punctual or to pass the punctuality test. A contingent trajectory may only be punctuality valid if one or less trajectories are missed, and so on. In this way, the described techniques may utilize a punctuality test to validate potential trajectories, with the limits or the metrics used to determine whether a trajectory passes or fails the punctuality test configurable in a number of different ways.

A punctuality check may be performed to ensure that a trajectory was received recently, and may include comparing a time that a trajectory was received, for example by the TMP 222 from the trajectory planner AI 212, to a current time, as may be maintained by the TMP. For example, it is also possible that there is X seconds of radio silence followed by a trajectory that is freshly created. In this case, the trajectory would fail the punctuality test but would pass a staleness test, as would be described in greater detail below. In other words, the punctuality test, as described herein ensures that new trajectories are received punctually.

At operation 1108, a consistency validity, e.g., represented by a value such as a binary value, for the trajectory may be determined. In some cases, operation 1108 may be performed by the consistency validator 310. The consistency validity or consistency validity value may generally indicate whether the potential trajectory is within certain physical relation to the current trajectory the vehicle is traveling. In some cases, the certain physical relation may be defined by one or a number of different values, with those values potentially modified by operational characteristics or limitations (e.g., feasibility values) of the vehicle. The values may include a distance difference, a time difference, a steering threshold, a yaw threshold, a velocity deviation threshold, or a collinearity threshold. Such a validity may differ from the feasibility validity as the comparison is based on trajectories and not vehicle states. In such a comparison, it is expected that during nominal operations of the vehicle, subsequent trajectories shouldn't diverge significantly from a previously generated trajectory (if generated quickly enough, e.g., every 100 ms or faster). Divergences, therefore, may flagged, in such examples, as indicative of an error in the planner subsystem. In some aspects, small divergence may be acceptable, such that one or more threshold deviation values are used to determine whether a difference would cause a trajectory to be inconsistent with a prior trajectory Determining the consistency validity value may include obtaining a current state of the vehicle, such as the current position, orientation, yaw, and/or velocity of the vehicle. A potential state of the vehicle may also be determined that would place the vehicle on the potential trajectory, preferably in a location on the potential trajectory closest or at least proximate to the current state of the vehicle. Based on the current state and the potential state, it may then be determined if the vehicle can safely and efficiently navigate to the potential trajectory. Determining consistency validity will be described in greater detail below in reference to FIGS. 12-13.

At operation 1110, a staleness value (also referred to as a staleness validity value) for the trajectory may be determined. In some aspects, operation 1110 may be performed by the staleness validator 316 In other cases, staleness may be considered part of the consistency validity and be performed by consistency validator 310. In some cases, staleness may be defined by when the trajectory was created relative to a current time or time the trajectory is assessed, as an indicator of whether the device is capable of moving to and preforming the trajectory. For example, a first temporal difference between a time the trajectory was created (e.g., as may be indicated in a time stamp associated with the trajectory) and a current time may be determined. This value, in some cases, may be compared to a time limit, such as a predefined time limit, for a feasible trajectory. A time difference that meets or exceeds the time limit may have the staleness validity value set to false.

At operation 1112, a validity signal may be generated based on the feasibility, the punctuality, consistency, and/or staleness values. In some cases, a true or positive value may be generated when all four values are positive or indicate that the vehicle can navigate to the trajectory safely, etc. In cases where one or more values are negative, a negative result may be generated at operation 1112. It should be appreciated, that is some cases, only a subset of the validity tests may be implemented (e.g., one or more of operations 1104/1106, 1108, 1110) to a similar effect, and that other tests or evaluations may be similarly combined with those described above.

In some aspects, process 1100 may include operation 1114, in which it may be determined if more trajectories have been received and/or are available for evaluation. As used herein, dotted lines when used to indicate an operation, are optional, such that the process may be performed without the indicated operation(s). If the determination is positive, process 1100 may loop through operations 1102-1112 until there are no more available trajectories and/or upon the expiration of a time threshold (e.g., a certain time before an actual trajectory has to be selected and implemented). In some cases, trajectories for evaluation may be selected according to state diagrams 700 and 800 described above.

Next at operation 1116, a trajectory may optionally be selected based on the validity values determined above. In some aspects, selecting the trajectory may utilize a state diagrams 700 and/or 800 described above. At operation 1118, the autonomous vehicle may be controlled in accordance with the selected trajectory based at least in part on the validity signal. In some examples, operation 1118 may include the TMP 222 sending a selected trajectory or indication thereof to primary compute unit 202, drive manager 402 and/or actuators 404 or other subsystem of the device or vehicle, to cause the device to follow the selected trajectory.

Figure 12:
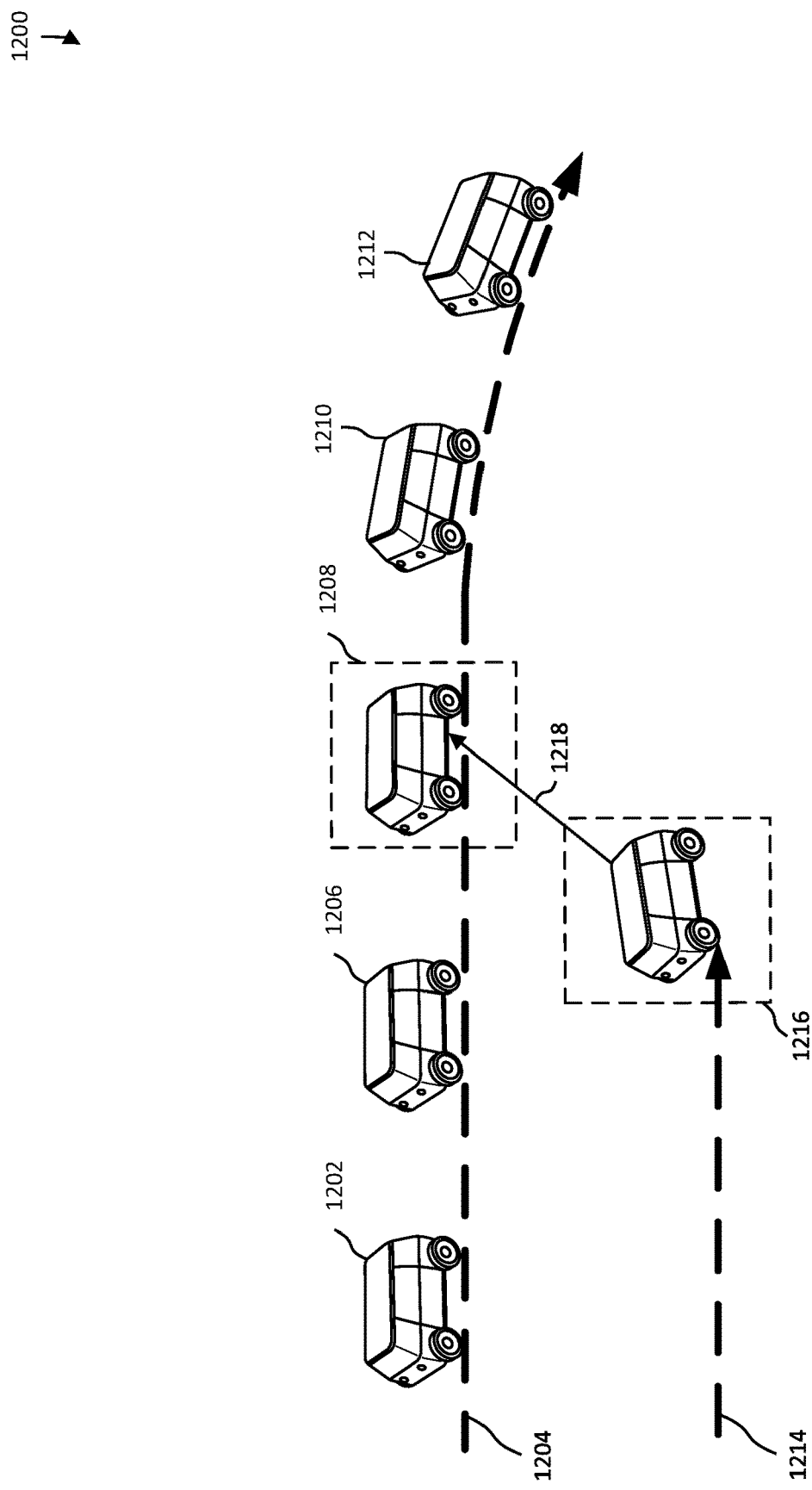
FIG. 12 illustrates an example diagram of an autonomous vehicle at multiple states relative to a trajectory.

FIG. 12 illustrates an example diagram of an autonomous vehicle, on current trajectory 1214, in physical relation to a potential trajectory 1204, as an example to illustrate various features of the consistency and feasibility validity tests, as described herein. In the illustrated example, trajectory 1204 may define a right hand turn and may be represented by a number of different states of vehicle on the trajectory, as represented by vehicle at states 1202 1206, 1208, 1210, and 1212. Current trajectory 1214 may be represented by vehicle at state 1216.

Each state of the vehicle, such as current state 1216 and a potential state 1208 may be defined or associated with one or more properties or parameters. For example, a state of the vehicle may be defined by one or more of a position, an orientation, a yaw rate, a velocity, an acceleration, a jerk, and/or other physical and kinematic qualities of the vehicle at a given point in time and space.

In order to determine whether potential trajectory is consistent with a current trajectory or state of a vehicle, the current location may first be obtained or determined. In some cases, the current location could be an estimated location at a future time, for example, corresponding to a location when the vehicle would start the potential trajectory 1204 or at the end of trajectory 1214. The vehicle may be projected onto the potential trajectory 1204 into a potential state, such as state 1208. In some cases, state 1208 may be selected to be the closest location to the current state 1216 of the vehicle on trajectory 1204. The potential state 1208 may be determined relative to the current state 1216, to, for example minimize the distance between the two points. This may include a geometric evaluation (such as determining a shortest Euclidian distance between the trajectory 1204 and state 1216 or via other means).

In some cases, a current trajectory, represented by a state of the vehicle at location 1216, may be compared to state 1208 on potential trajectory 1204. Each state 1216 and 1208 of the vehicle may be represented by a number of parameters, such as position, orientation, yaw, and/or velocity. These values may be compared to determine one or more deviation values, such as a distance between the two states, a command steering position difference between the vehicle at the first state 1216 and vehicle at the second state 1208, a yaw deviation between the two states, and/or a velocity deviation between the two states. For example, a distance to trajectory threshold may indicate when a vehicle is too far from a potential trajectory to be consistent. Another example includes a command steering position, which may be how far a vehicle would have to change its steering angle to reach the potential trajectory. The deviation values may then be compared to one or more thresholds to determine if the potential trajectory 12104 is consist with a current trajectory of the vehicle. In some cases, if one deviation value is greater than a set or allowed difference, the potential trajectory will be found inconsistent. In some aspects, the difference may be linear, and in other metrics, such as derived metrics, other comparisons may be utilized to determine whether the trajectories are consistent.

In some cases, different velocity deviation thresholds may be determined and used for different velocities or ranges of velocities of the vehicle, such as via a clamping function. For example, when the vehicle's current velocity on a current trajectory is between 0.05 and 3 meters per second, a threshold may be set at a 10% difference. At higher speeds, the threshold may be set lower, such that a 5 or 7% difference would exceed an allowable velocity deviation.

In some cases, the consistency check may also include a determination as to whether the potential state 1204 is collinear with trajectory 1214. This may be performed, for example, by taking the cross product of two vectors representing the two trajectories. This may be performed to ensure that the two trajectories 2104 and 1214 align to a great enough extent to be safe for passengers and not strain or otherwise place the vehicle or passengers under undue forces.

In some aspects, consistency may include a test of check for staleness, such that a potential trajectory that was created too long ago, such as more than 1,000 ms, may not be validated for consistency. In other cases, stateless may be determined separately from consistency, as its own validity check.

In some examples, the difference may be compared to one or more allowable or deviation values, such as any of a number of variables, allowable values, or thresholds used to determine if two trajectories, a state and a trajectory, or two states, are consistent. For example, a distance to trajectory threshold may indicate when a vehicle is too far from a potential trajectory to be consistent. Other thresholds may include a command steering position (e.g., how far a vehicle would have to change its steering angle to reach the potential trajectory), a yaw deviation, one or more velocity deviations, associated with different velocity ranges of the vehicle, and a collinearity deviation.

In some aspects, the feasibility check may include determining whether the vehicle can travel to the potential trajectory 1204 from a current state 1216, within one or more capability or feasibility limits of the vehicle. This may include determining kinematics that would move the vehicle from state 1216 to state 1208, represented by line 1218. This may include determining the required acceleration or deceleration in the primary direction of movement (continuing in the direction of trajectory 1214), lateral acceleration or deceleration, and/or the resultant acceleration. The kinematic determination may be based on the current position of the vehicle (e.g., the location corresponding to the state of the vehicle), a current speed or velocity of the vehicle, direction of travel, and other properties of the vehicle at state 1216, and the corresponding resultant values at the potential state 1208.

Figure 13:
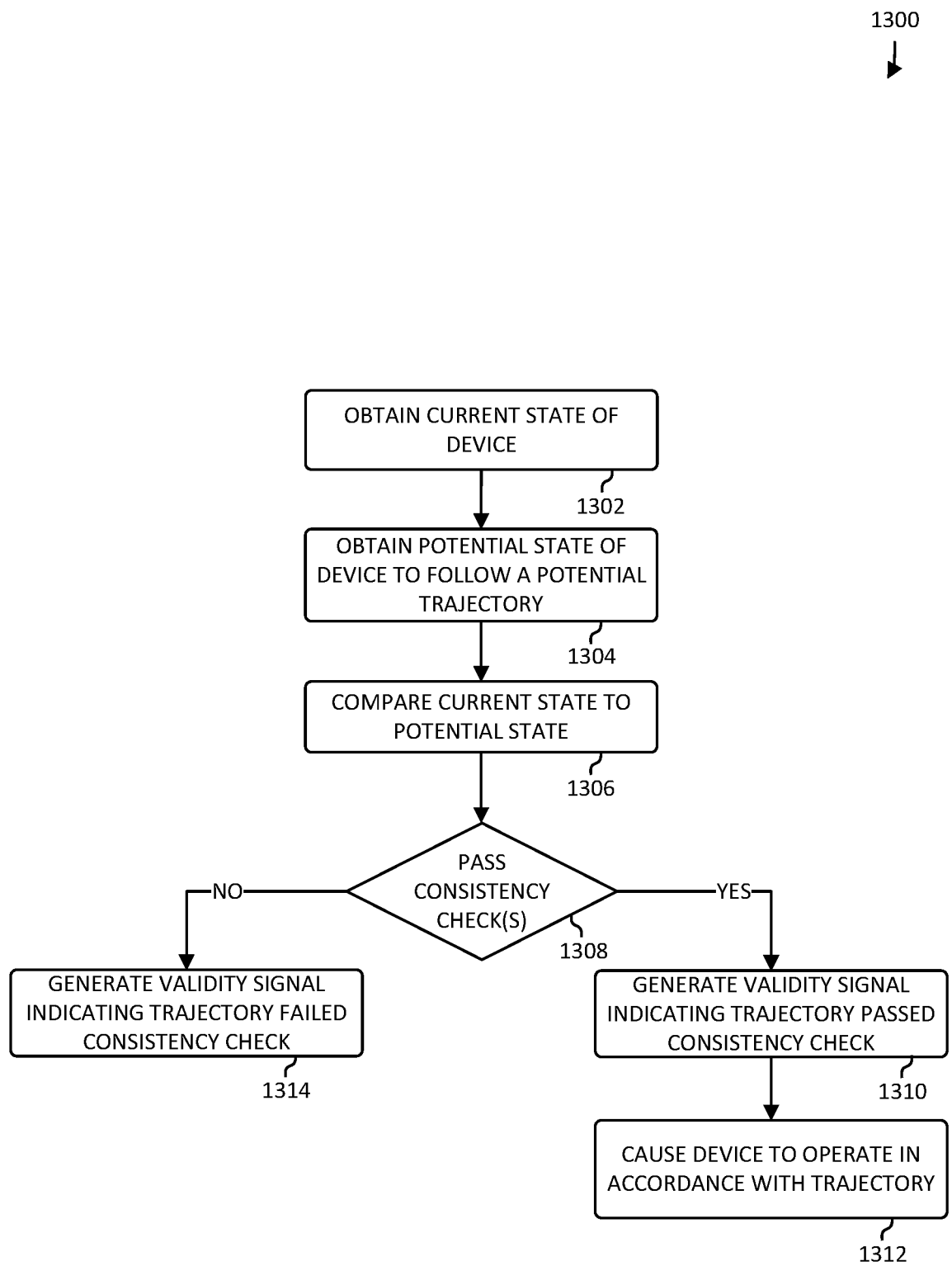
FIG. 13 illustrates an example process for validating consistency of a trajectory.

In some aspects, one or more of the feasibility thresholds may be modified based on one or more operational statuses of the vehicle or subsystems of the vehicle. For example, a subsystem of the vehicle may detect that tire pressure is low in one or more of the tires. The system monitor, for example, may modify a set of feasibility values for the vehicle, based on detecting the tire pressure is low. FIG. 13 illustrates an example process for performing a consistency check on a potential trajectory and causing a device to operate in accordance with the potential trajectory based on the consistency check, which may be performed by a TMP, such as TMP 222 and/or by planning subsystem 1328, as described below in reference to FIG. 16. Process 1300 may be a more detailed example of operation 1108 of process 1100 described above in reference to FIG. 11.

Process 1300 may begin at operation 1302, in which a current state of the device, such as an autonomous vehicle, may be obtained. In some aspects one or more components of an autonomous vehicle may determine the current state, such as the TMP 222 and/or system monitor 220 described above. In some aspects, the current state may be defined by a first set of values including one or more of a first position, a first orientation, a first yaw rate, or a first velocity.

At operation 1304, a potential state of the device to follow a potential trajectory may be obtained, for example, by TMP 222 in the case the device is an autonomous vehicle, and/or system monitor 220. In some cases, operation 1304 may include determining the potential state based on the current state, such as a location proximate to a location associated with the current state.

At operation 1306, the current state may be compared with the potential state, and at operation 1308, it may be determined if the potential trajectory passes one or more consistency checks. The one or more consistency checks may include one or more of the consistency checks described above. Operations 1306 and 1308 may include generating a difference between the current state and the potential state, and comparing the difference to a set of deviation values, such as described above.

If the determination at operation 1308 is negative, a failed validity signal may be generated at operation 1314, and another trajectory selected for evaluation. If, however, the determination at operation 1308 is position, a validity signal indicating a valid trajectory may be generated at operation 1310, and the device may be caused to operate in accordance with the potential trajectory, at operation 1312.

Figure 14:
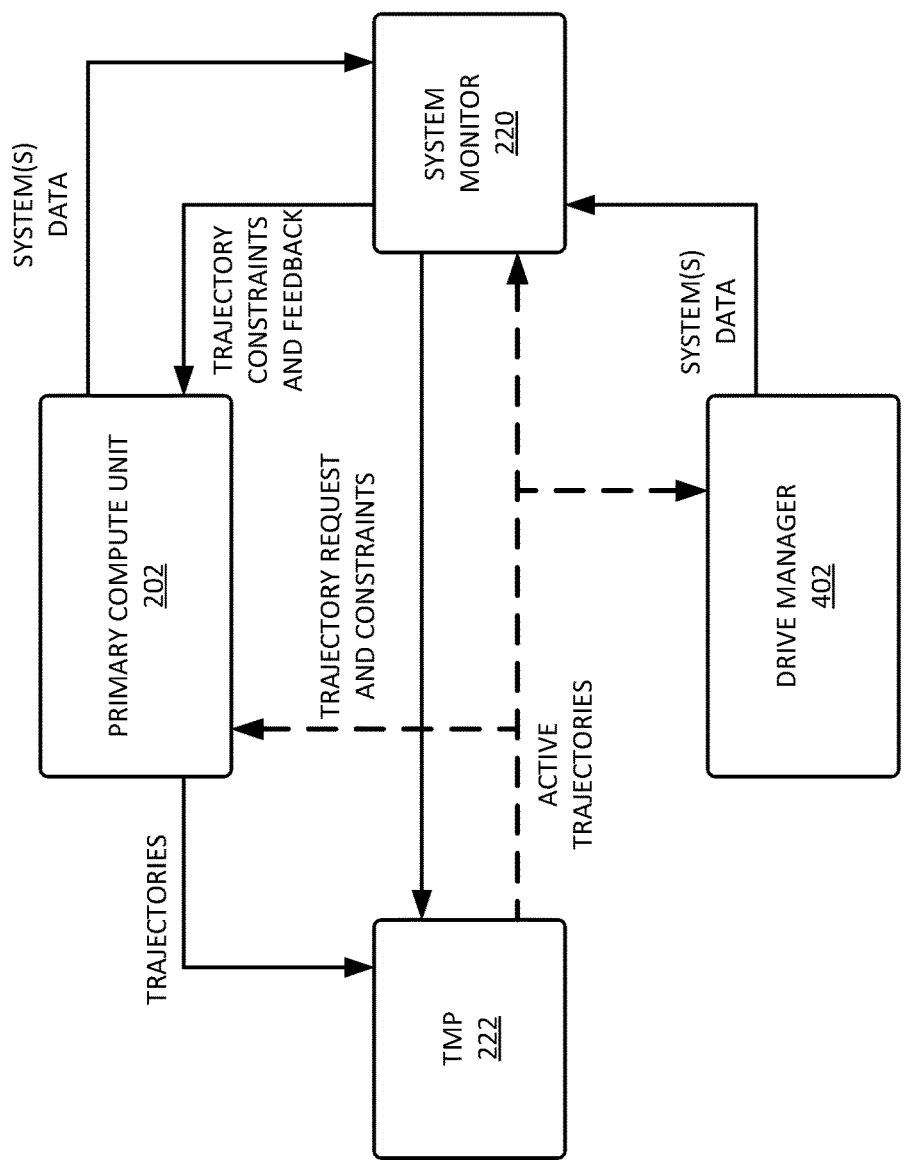
FIG. 14 illustrates example communications between various sub-systems of an autonomous vehicle, such as illustrated in the system of FIG. 2 for updating feasibility constraints of the autonomous vehicle.

FIG. 14 illustrates example communications 1400 between various sub-systems of an autonomous vehicle, such as autonomous vehicle described in reference to FIGS. 2-5. Communications 1400 illustrate an example way in which a system monitor 220 may send vehicle updates to feasibility limits or values imposed on the vehicle.

In the example illustrated, system monitor 220 may receive system data from various sources within the autonomous vehicle, such as from the primary compute unit 202 and/or drive manager 402. The system data may include various updates, status information, heartbeat information, and the like from various subsystems of the vehicle. In some aspects, the system data received by the system monitor 220 may also include sensor data concerning the environment in which the vehicle is operating, such as weather, road conditions, temperature, etc.

The system monitor 220 may maintain a set or data structure of feasibility limits of the device. These feasibility limits or capability limits may define various physical limits imposed on movement of the vehicle. One example may include various feasible actions or limits on actions of the vehicle, and may include values for both a default capability and a current capability. For example, the feasible actions may include a maximum velocity, a maximum longitudinal deceleration, a maximum longitudinal acceleration (in direction of current motion), a maximum lateral acceleration, and a maximum resultant acceleration (e.g., maximum acceleration laterally and longitudinally). It should be appreciated that other feasible actions/limits may also be imposed on the vehicle to increase safety in operation of the vehicle and safety to passengers.

The system monitor 220 may update the feasibility limits according to various inputs received by the system monitor 220, including system data and status updates from the primary compute unit 202 and/or drive manager 402, and/or other data, such as sensor data. In some aspects, the system monitor 220 may maintain and update various status information on various subsystems of the vehicle, including, for example a current state of a number of subsystems, which may affect one or more feasibility limits. In one example, operational states or statuses for various subsystem of an autonomous vehicle 1400 may include tire pressure information, motor operation as a percentage, various components of the vehicle electrical system, and various other subsystems as may be found in a vehicle or autonomous vehicle, or other device capable of movement. In some cases, the operational states of various subsystems may be represented numerically (e.g., as a percentage), as one of three functional, degraded, and inoperable states, or via some other scheme. In some aspects system monitor 220 may receive status updates for various subsystems of the vehicle periodically, upon a change in condition, or at other, periodic or non-periodic intervals. In some aspects, the interval may correspond to when new trajectories are created and/or evaluated.

The system monitor 220 may also maintain or access a collection of values indicating the impact of one or more changes to the operational state or status of the various subsystems on the feasibility limits or values. In one example, the effect of a various levels or PSI values of a tire pressure monitoring system (TPMS), which are examples of operational states or statuses, may be correlated to different effects or limits for one or more of maximum velocity, maximum longitudinal acceleration, maximum longitudinal deceleration, maximum lateral acceleration, and/or maximum resultant acceleration. In a similar way, any subsystem or sensor input of the vehicle may be correlated to a change in one or more of the feasibility values for the vehicle. In some cases, the effects of various operational statuses of subsystems of the vehicle may be determined empirically, preset, or present and adaptable to operating conditions of the vehicle, user preferences, etc. In some cases, a change in a single subsystem, such as tire PSI, may effect more than one feasibility limit. In some examples, the operational status of two or roe subsystems may contribute to a change in a single or multiple feasibility limits of the vehicle The system monitor 220 may utilize the above-described information to update the feasibility limits or physical operational limits of the vehicle or device by obtaining subsystem status information, determining what impact the subsystem status information has on one or more of the feasibility limits, and updating the affected feasibility limits. In other aspects, one or more of the described operations may additionally or alternately be performed by the TMP 222 or other aspect of the primary or secondary compute units 202, 204.

In some aspects, a collection of feasibility limits, and/or adjustments thereto may be specific to one or more trajectory types, such as primary trajectory, a contingent trajectory, and so on. In this example, the system monitor 220 may set different capability limits for different types of trajectories. For example, a maximum velocity of a contingent trajectory may be set lower than for a primary trajectory. Similarly, a change in the status of one or more subsystem of the vehicle may cause different impacts to feasibility limits of different types of trajectories. For example, a change in tire pressure may cause a first decrease in maximum longitudinal deceleration for a primary trajectory and a second decrease in maximum longitudinal deceleration for a contingent trajectory.

Upon updating the feasibility limits, the system monitor 220 may send the updated limits, e.g., in the form of one or more values TMP 222 and primary compute unit 202. The TMP 222 may use the feasibility limits in the process of validating potential trajectories and the primary compute unit 202 and/or trajectory planner AI 212 may use the feasibility limits in generating new trajectories. Upon selecting a potential trajectory, the TMP 222 may then send the one or more trajectories to the primary compute unit 202, system monitor 220, and drive manager 402 to provide further feedback for future trajectory determination.

Figure 15:
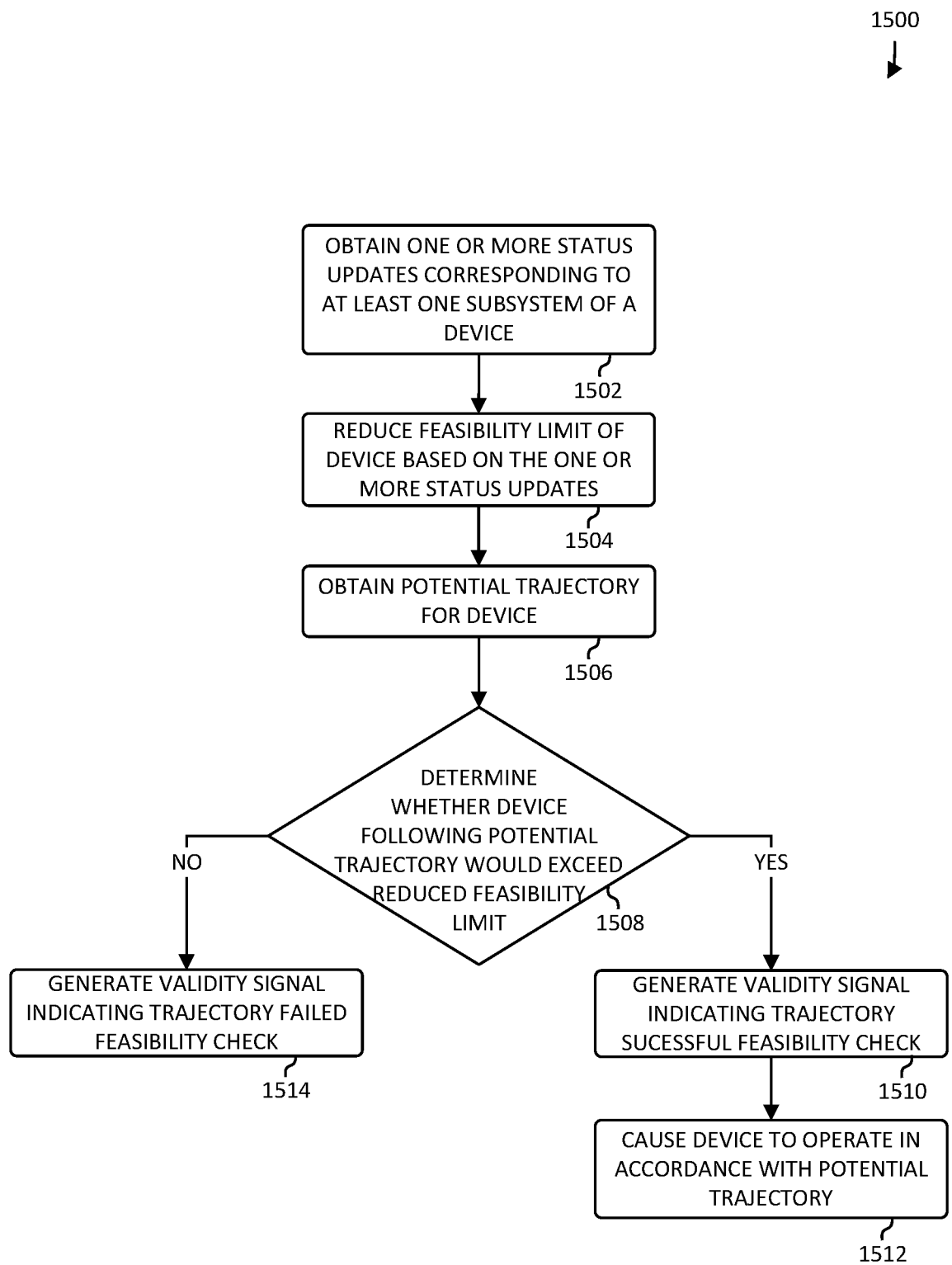
FIG. 15 illustrates an example process for validating feasibility of a potential trajectory.

FIG. 15 illustrates an example process for validating feasibility of a potential trajectory, which may be performed by one or more of TMP 222 and system monitor 220, described above and/or by planning subsystem 1628, as described below in reference to FIG. 16. Process 1500 may be a more detailed example of operation 1104 of process 1100 described above in reference to FIG. 11.

Process 1500 may begin at operation 1502, in which one or more status updates corresponding to at least one subsystem of the device may be obtained. The one or more status updates may come directly from the subsystems, sensors associated therewith, or from a monitoring system, such as system monitor 220. The status updates may indicate an operational status or value of a subsystem, such as tire pressure values, battery charge levels, an operational level (e.g., percentage), etc., or may indicate that a certain subsystem is malfunctioning. In this example, an operational status or status update may be derived from the indication that the subsystem is not operating at 100% capacity, and so on.

At operation 1504, a feasibility limit for the device may be reduced based on the one or more status updates. In some aspects, operation 1504 may include updating one or more capability values. In some aspects, a change in one subsystem may affect more than one feasibility limit. In this scenario, more than one feasibility or capability limit may be updated. In other cases, a feasibility limit may be increased or restored to a default limit based on one or more positive status updates of the device.

At operation 1506, a potential trajectory for the device may be obtained, for example, from trajectory planner AI 212. At operation 1508, it may be determined whether the device following the potential trajectory (or navigating to the start or onto a point on the potential trajectory) would exceed the reduced feasibility limit. Operation 1508 may include simulating or determining one or more kinematic values for the vehicle, such as acceleration, velocity, direction change, etc., to navigate to and follow the potential trajectory.

If the determination at operation 1508 is negative, a failed validity signal may be generated at operation 1514, and another trajectory selected for evaluation. If, however, the determination at operation 1508 is positive, a validity signal indicating a valid trajectory may be generated at operation 1510, and the device may be caused to operate in accordance with the potential trajectory, at operation 1512.

Figure 16:
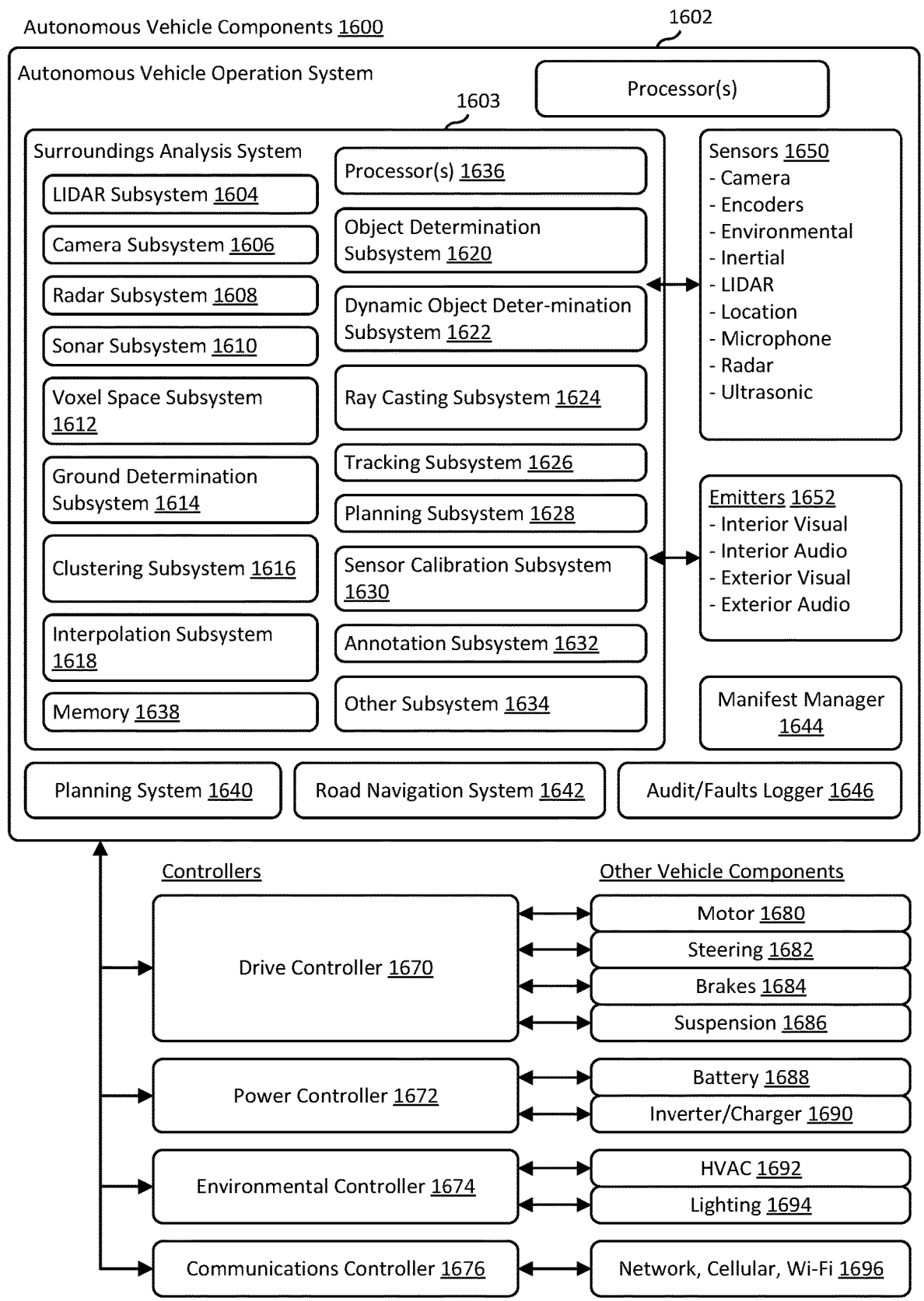
FIG. 16 illustrates an example of elements that might be used according to an architecture of an autonomous vehicle.

FIG. 16 illustrates an example of elements that might be used according to an example architecture of autonomous vehicle components 1600 of an autonomous vehicle for validating and selecting trajectories for navigation. The autonomous vehicle might be characterized as having an autonomous vehicle operation system 1602, coupled to various controllers, which in turn are coupled to various components of the autonomous vehicle to handle locomotion, power management, etc. Elements of the autonomous vehicle operation system 1602 provide for a computational system for generating trajectories and performing one or more verifications of those trajectories, as described herein. These elements might find use in other applications outside of autonomous vehicles.

The architecture 1600 may specify one or more computer system(s) including various hardware, software, firmware, etc. to implement aspects of the systems, methods, and apparatuses described herein. For example, the autonomous vehicle operation system 1602 may include a surroundings analysis system 1603 and other components usable for various aspects of an autonomous vehicle. The surroundings analysis system 1603 might be used to take in information that the autonomous vehicle operation system 1602 might use to operate controllers for a motor, steering, object avoidance, etc.

The surroundings analysis system 1603 might be organized as a plurality of subsystems to simplify implementation, allow for separate teams to develop for specific subsystems, or for other reasons. In some embodiments, the subsystems are implemented independently, while in other embodiments, more than one subsystem are integrated together in part or in full. The subsystems might include a LIDAR subsystem 1604, a camera subsystem 1606, a radar subsystem 1608, a sonar subsystem 1610, a voxel space subsystem 1612, a ground determination subsystem 1614, a clustering subsystem 1616, an interpolation subsystem 1618, an object determination subsystem 1620, a dynamic object determination subsystem 1622, a ray casting subsystem 1624, a tracking subsystem 1626, a planning subsystem 1628, a sensor calibration subsystem 1630, an annotation subsystem 1632, and possibly other subsystems 1634.

A given subsystem might be implemented with program code or hardware for communicating with other subsystems, to receive inputs and provide outputs. Some of the inputs might be from sensors. In some description herein, for readability, a subsystem might be described as including sensors the subsystem obtains data or signals from and/or emitters that the subsystem outputs data or signals to. For example, a sonar subsystem might be described as having an ultrasonic sensor or might be described as receiving signals from an ultrasonic sensor. As another example, a camera subsystem might be described has having a camera and a display or might be described as receiving signals or data from a camera and sending signals or data to a display.

Although not shown in FIG. 16, it should be understood that communication among subsystems can be provided for as needed. A given subsystem might communicate with another subsystem by sending data over some channel directly to the other subsystem, or the surroundings analysis system 1603 might comprise a bus subsystem or communication infrastructure over which subsystems can communicate by passing data and/or signals there between. The surroundings analysis system 1603 might also be configured to receive external data and to communicate information to outside the surroundings analysis system 1603.

A given subsystem might have some of its own computational processing, which might be performed by hardware dedicated to that given subsystem or might be performed by a processor or circuit assigned to perform computation of that subsystem, as might be the case where the subsystem is implemented entirely in software and is executed by one or more processor(s) 1636 using a memory 1638, such as a program code memory and data storage memory. The memory might be for temporary storage of variables and data, such as RAM, and memory for permanent storage (i.e., data that persists without needing refresh, power, etc. for some period of life) and should be implied where indicated even if not explicitly mentioned. For example, where a subsystem is described as operating on a database or storing data, there would be some form of memory for storing data in electronically-readable form. In some cases, the database or data storage in memory is not specific and internal to one subsystem. In those cases, the memory is accessible by more than one subsystem. For example, one subsystem might create records based on sensor data obtained by that subsystem and write those records to a database or other data structure and, in turn, another subsystem can read and use that data. Where a subsystem is implemented in software, the subsystem might include program code coupled to a processor specific to that subsystem or a more general program code memory and processor.

In some instances, the surroundings analysis system 1603 is employed in an autonomous vehicle. In some instances, the surroundings analysis system 1603 may provide perception and planning functionality for the autonomous vehicle. In general, the surroundings analysis system 1603 may provide for LIDAR perception, radar perception, vision (camera) perception, acoustic perception, segmentation and classification, tracking and fusion, and prediction/planning, as well as interfacing to other controllers, such as a drive controller, a power controller, an environmental controller, and a communications controller.

The autonomous vehicle operation system 1602 may include a planning system 1640, a road navigation system 1642, a manifest manager 1644, and an audit/fault logger 1646. The autonomous vehicle operation system 1602 might also include, or interface to, various sensors 1650 and emitters 1652.

The autonomous vehicle operation system 1602 might interface to a drive controller 1670 that interacts with motors 1680, steering 1682, brakes 1684, and a suspension 1686, a power controller 1672 that interacts with a battery 1688 and an inverter/charger 1690, an environmental controller 1674 that interacts with heating, venting, air conditioning (HVAC) components 1692 and lighting 1694, and a communications controller 1676 that handles communications between the autonomous vehicle, devices in use with the autonomous vehicle and external devices, such as via a network, a cellular channel, or a Wi-Fi channel 1696. A combination of autonomous vehicle operation system 1602, the controllers, and the vehicle components installed in an autonomous vehicle can provide for a vehicle that is able to navigate safely without constant human intervention.

Referring again to the surroundings analysis system 1603 and its subsystems, the LIDAR subsystem 1604, the LIDAR subsystem 1604 may include one or more LIDAR sensors to capture LIDAR data for segmentation, as described herein, and may comprise any one or more depth sensors as described in detail herein. In some instances, the LIDAR subsystem 1604 may include functionality to combine or synthesize LIDAR data from a plurality of LIDAR sensors to generate a meta spin of LIDAR data, which may refer to LIDAR data based on multiple LIDAR sensors. In the case of a meta spin of LIDAR data, the LIDAR subsystem 1604 may include functionality to determine a virtual origin of the meta spin data (e.g., a coordinate reference frame common to all LIDAR sensors) and perform a data transformation such that LIDAR data from each of the one or more LIDAR sensors is expressed with respect to the virtual origin. As may be understood in the context of this disclosure, the LIDAR subsystem 1604 may capture data and may transmit datasets to other subsystems of the surroundings analysis system 1603 for subsequent processing.

The camera subsystem 1606 may include, or interface to, one or more camera sensors to capture vision data for image segmentation and/or classification. The camera subsystem 1606 may include any number and type of camera sensors. For example, the camera subsystem 1606 may include any color cameras, monochrome cameras, depth cameras, RGB-D cameras, stereo cameras, infrared (IR) cameras, ultraviolet (UV) cameras, etc. As may be understood in the context of this disclosure, the camera subsystem 1606 may capture data and may transmit datasets to the other subsystems for subsequent processing. For example, data from the camera subsystem 1606 may be included as one or more channels of a multi-channel image that is processed as such by another subsystem.

The radar subsystem 1608 may include one or more radar sensors to capture range, angle, and/or velocity of objects in an environment. As may be understood in the context of this disclosure, the radar subsystem 1608 may capture data and may transmit datasets to other subsystems of the surroundings analysis system 1603 for subsequent processing. For example, data from the radar subsystem 1608 may be included as one or more channels of a multi-channel image provided to another subsystem.

The sonar subsystem 1610 may include, or interface to, one or more speakers or sound emitters and one or more microphones (such as a microphone array) to capture acoustic information from objects in an environment. Additionally, or in the alternative, such a sonar subsystem 1610 may comprise various ultrasonic transducers. For example, the sonar subsystem 1610 may cause an ultrasonic transducer to emit pulses of sound and may listen for echoes to determine a position and/or motion information associated with objects in the environment. As may be understood in the context of this disclosure, the sonar subsystem 1610 may capture data and may transmit datasets to the other subsystems for subsequent processing. For example, another subsystem of the surroundings analysis system 1603 might fuse data obtained from the sonar subsystem 1610 with data obtained from the LIDAR subsystem 1604, in order to more accurately segment objects and/or to determine information about the objects, or for other purposes.

The autonomous vehicle operation system 1602 may include any number or type of other sensors suitable for use in an autonomous vehicle beyond those illustrated. The various sensors 1650 may include, but are not limited to, ultrasonic transducers, wheel encoders, environmental sensors, microphones, inertial measurement unit(s) (IMU), accelerometers, gyroscopes, magnetometers, temperature sensors, humidity sensors, light sensors, global positioning system (GPS) sensors, location sensors, etc.

In some instances, the LIDAR subsystem 1604, the camera subsystem 1606, the radar subsystem 1608, and/or the sonar subsystem 1610 may provide one or more datasets for other subsystems of the surroundings analysis system 1603 for combining and/or synthesizing the data for improved segmentation.

The surroundings analysis system 1603 may further include storage for simulated data that has been generated by a computer simulation algorithm, for use in part in testing. In some instances, the simulated data may include any type of simulated data, such as camera data, LIDAR data, radar data, sonar data, inertial data, GPS data, etc. In some instances, surroundings analysis system 1603 can modify, transform, and/or perform the converting operations described herein on the simulated data for verifying an operation and/or for training machine learning algorithms, as described herein. For example, to test some functionality in a laboratory setting, simulated sensor data/signals might be supplied to subsystems as if it were actual sensor data, to test performance of some subsystems.

The voxel space subsystem 1612 may include functionality to convert or map data to a voxel map. For example, the voxel space subsystem 1612 can receive LIDAR data, camera data, radar data, sonar data, etc., and map, convert, or associate individual data points to a voxel map representing a three-dimensional space in an environment. A voxel space is a logical representation of a three-dimensional environment, such as the space surrounding an autonomous vehicle, which is represented as discrete small volumes, e.g., voxels. A voxel map provides data or values for respective voxels in the voxel space. As a representation of the three-dimensional environment, the voxel map can be stored in memory and manipulated by a processor.

In some instances, the voxel space subsystem 1612 can define dimensions of a voxel space, including a length, width, and height of the voxel space. Further, the voxel space subsystem 1612 may determine a size of individual voxels. In some instances, voxels may be a uniform size and shape throughout the voxel space, while in some instances, a size and/or density of voxels may vary based on a relative location in the voxel space. For example, a size of a voxel may increase or decrease in proportion to a distance of the voxel from an origin or center of the voxel space. Additionally, or in the alternative, such the voxel space subsystem 1612 may comprise a transformation between a virtual origin and an origin of the voxel space. In some instances, the voxel space subsystem 1612 may include functionality to generate a sparse voxel space wherein voxels that do not include data, or that include an amount of data below a data threshold, need not be present in the voxel map and the values of those voxels can be assumed or ignored. In such an instance, the voxel map may be organized as an octomap, a voxel hashing, or the like. In some instances, the voxel space subsystem 1612 may include functionality to reduce an amount of noise in the data of a voxel map or the data used to generate the voxel map by filtering data as it is mapped to the voxel space and stored in the voxel map. For example, filtering may include removing data below a threshold amount of data per voxel (e.g., a number of LIDAR data points associated with a voxel) or over a predetermined number of voxels (e.g., a number of LIDAR data points associated with a number of proximate voxels). In some instances, the voxel space subsystem 1612 can update a voxel map as data is gathered over time, and or in response to an autonomous vehicle navigating within the real-world environment the voxel space corresponds to. For example, the voxel space subsystem 1612 may add data and/or discard data from the voxel map as an autonomous vehicle navigates in an environment.

In some instances, the voxel space subsystem 1612 can initialize the voxel map, and other voxel space parameters, such as voxel size, orientation, and extent, treating the initial voxel map as representing as empty space and the voxel space subsystem 1612 can build up representations of objects as LIDAR data is captured over time. In other instances, the voxel space subsystem 1612 can initialize the voxel map and voxel space parameters using global map data so that locally captured LIDAR data can be used to localize the autonomous vehicle within the global map space, and can be used to clean up or clear voxels of the global map.

The ground determination subsystem 1614 may include functionality to parse through individual voxels of the voxel space to determine a ground associated with the environment in the voxel space. For example, the ground determination subsystem 1614 may determine a locally flat voxel by estimating a plane representative of the data associated with a particular voxel and determining a normal vector of the plane. For example, the ground determination subsystem 1614 may perform a principal component analysis on the voxels of a voxel map to determine a smallest principal component associated with the data associated with the voxel. In some examples, for a principal component analysis, the smallest eigenvector may correspond to the normal vector of the plane, while an eigenvalue associated with the eigenvector may correspond to a spread or level of diffusion of the data associated with the particular voxel in the direction of the smallest eigenvector.

By way of another example, and without limitation, such a surface normal determination may be done by calculating the normal of the cross product of vectors indicating directions from a point P in a voxel, to two of P's nearest neighbors. By way of another example and without limitation, such a surface normal determination may be done by performing an eigenvalue decomposition on the covariance matrix associated with an individual voxel. In some instances, the ground determination subsystem 1614 may determine whether a target voxel is a locally flat voxel by determining a surface associated with the target voxel based on values associated with neighboring voxels. Further, in some instances, the ground determination subsystem 1614 may utilize a marching cubes-type algorithm to create a mesh based on average point values associated with voxels to determine triangles including at least three points to create a surface. Further, the ground determination subsystem 1614 may receive a reference orientation, which may correspond to a direction or an orientation of an autonomous vehicle. The ground determination subsystem 1614 may determine that a voxel is a locally flat voxel if the normal vector associated with the voxel is within a threshold amount of the reference orientation, as described above.

The clustering subsystem 1616 may operate in conjunction with the ground determination subsystem 1614 to determine a ground region, perhaps by growing a representation of a ground region in memory, starting with a surface that is closest to the origin of the LIDAR data, or starting with a surface that is under an autonomous vehicle. That is, voxels at positions in a voxel space that correspond to real-world positions proximate to an autonomous vehicle may be used as seed voxels by the clustering subsystem 1616, which can then extend representations of voxels from those seed voxels. The clustering subsystem 1616 may determine that locally flat voxels that are adjacent belong to a same cluster, and may grow a region to encompass a ground plane. Further, the clustering subsystem 1616 may operate in conjunction with the object determination subsystem 1620, discussed below, to determine that voxels, in a cluster or otherwise, are associated with a particular object. The clustering subsystem 1616 may utilize a variety of clustering algorithms, including but not limited to region growing, hierarchical clustering, partitional clustering, square error clustering, graph theoretic clustering, mixture-resolving clustering, mean-seeking clustering, k-means clustering, N-cut clustering, proximity clustering, etc.

The interpolation subsystem 1618 may operate in conjunction with the ground determination subsystem 1614 and/or the clustering subsystem 1616 to combine or associated various clusters together to expand a representation of a ground plane. For example, locally flat voxels may not form a single cluster when determining the ground region associated with the autonomous vehicle, in which case, the interpolation subsystem 1618 may interpolate between points to determine if a gradient is above or below a threshold gradient for growing the ground plane cluster. Additional aspects of the ground determination subsystem 1614, the clustering subsystem 1616, and the interpolation subsystem 1618 might be provided elsewhere herein as needed for understanding of those subsystems.

The object determination subsystem 1620 may include functionality to determine objects represented in the voxel space by the voxel map. For example, the object determination subsystem 1620 may receive an indication of the ground plane from the ground determination subsystem 1614 and/or receive an indication of some or all of the locally flat voxels and may remove the voxels associated with a ground from the voxel space, so that the voxel map might only contain values for other voxels. Next, the object determination subsystem 1620 may parse through the remaining voxels to determine objects based on connectivity of voxels. For example, the object determination subsystem 1620 may operate in conjunction with the clustering subsystem 1616 to grow regions in the voxel space corresponding to objects by determining that adjacent voxels are to be considered to be a part of a same object. The object determination subsystem 1620 may assign an object identifier to all voxels associated with a particular object, and in some instances, the object identifier assigned or determined by the object determination subsystem 1620 may be propagated to LIDAR data associated with voxels comprising the particular object. The additional information about objects, grounds, clusters, and the like might be stored with the voxel map or as separate data structures. Additional aspects of the object determination subsystem 1620 might be provided elsewhere herein as needed for understanding of the object determination subsystem 1620.

The dynamic object determination subsystem 1622 may include functionality to distinguish between static objects and dynamic objects that might be determined to be present in the space corresponding to the voxel space. For example, the dynamic object determination subsystem 1622 may accumulate data over time to determine motion of objects by comparing voxel values at a first time to the voxel values at a second time to determine if an occupancy of the voxel has changed over time. For example, if a voxel was occupied by an object at a first time and is not occupied by the object at a second time, the dynamic object determination subsystem 1622 might deem that object to be a dynamic object and record that assessment as voxel map data. Based on which voxels are occupied or not occupied over time, the dynamic object determination subsystem 1622 can determine a movement of the dynamic object, such as a speed and direction of movement. In some instances, the dynamic object determination subsystem 1622 can provide an indication to determine a movement from the dynamic objects. Additional aspects of the dynamic object determination subsystem 1622 might be provided elsewhere herein as needed for understanding of the dynamic object determination subsystem 1622.

The ray casting subsystem 1624 may operate in conjunction with the dynamic object determination subsystem 1622 to distinguish between static objects and dynamic objects. Further, the ray casting subsystem 1624 may include functionality to clear the voxel map over time as data accumulates in the representation of the voxel map. For example, as an object moves throughout the voxel space over time, the representation of voxels occupied by a dynamic object may involve more and more data over time. However, the ray casting subsystem 1624 may analyze a path of a ray associated with LIDAR data, for example, to determine that some voxels through which the ray travels should be deemed cleared and the corresponding storage in the voxel map be cleared. Thus, the ray casting subsystem 1624 may provide additional functionality to determine that voxels occupied at a first time are not occupied at a second time, which may be provided to the various subsystems to determine that objects are dynamic objects, for example. In some instances, the voxel map may be represented in a sparse manner (e.g., providing data representing occupied voxels and disregarding unoccupied voxels) or in a dense manner (e.g., without discarding voxels). In some instances, the ray casting subsystem 1624 may store ray casting information in a dense manner, which is to say that voxels that don't exist in a sparse voxel representation (e.g., because voxels do not have associated LIDAR data) can have ray casting information associated with such voxels. For example, voxels without associated LIDAR data can nevertheless be represented in a dense voxel map to include ray casting information associated with the voxels of the voxel space. In some instances, the dense voxel representation may associate positive information with a voxel that a voxel is unoccupied, at least partly in response to the ray casting operations discussed herein. Further, as LIDAR data is accumulated for individual voxels, the negative information may be associated in the voxel map with individual voxels to indicate that they are occupied with a static object, for example. As data is accumulated over time, the information can be aggregated, in part, to determine whether a voxel corresponds to open space or a static object, for example. Further, the ray casting subsystem 1624 may be used to clean up a global map by comparing the locally captured LIDAR data against global map data. Additional aspects of the ray casting subsystem 1624 might be provided elsewhere herein as needed for understanding of the ray casting subsystem 1624.

The tracking subsystem 1626 may include functionality to receive an indication of one or more dynamic objects and perform additional processing in order to track the objects. For example, the tracking subsystem 1626 may determine a velocity of a dynamic object and/or may determine and store a trajectory of the dynamic object over time. In some instances, the tracking subsystem 1626 may be programmed to perform a prediction algorithm that may predict a path of the object to be tracked based on previous motion of the object.

The planning subsystem 1628 may include functionality to receive segmented data and/or indications of the ground plane, static objects, and/or dynamic objects to determine a trajectory of an autonomous vehicle. For example, the planning subsystem 1628 may receive segmentation information identifying the ground plane and may generate a trajectory for the autonomous vehicle to follow. The planning subsystem 1628 and/or another subsystem of the operation system 1602 may include or implement a collision avoidance system, as described above, for performing one or a number of verifications on the trajectories determined by the planning subsystem 1628.

The sensor calibration subsystem 1630 may include functionality to calibrate one or more sensors based at least in part on the segmentation information determined with respect to an environment. For example, while sensor data from the LIDAR subsystem 1604, camera subsystem 1606, radar subsystem 1608, and/or sonar subsystem 1610 may be used to estimate a location and/or orientation (e.g., using simultaneous localization and mapping (SLAM)), an autonomous vehicle may also include additional sensors, such as an inertial measurement unit (IMU) and/or a GPS unit, for determining a location of the autonomous vehicle in an environment. In some instances, the IMU may indicate that the autonomous vehicle is in a first location, while an analysis of the LIDAR data discussed herein indicates that the vehicle is in a second location different from the first location. The sensor calibration subsystem 1630 may determine a difference in the locations and may adjust or calibrate one more sensors to update a location of the autonomous vehicle or one or more sensor intrinsic characteristics or extrinsic characteristics.

The annotation subsystem 1632 may include functionality to receive segmentation information discussed herein and may annotate the ground plane, static objects, and/or dynamic objects with information associated with the objects, stored as data with the voxel map or otherwise. In some instances, the annotation subsystem 1632 may provide segmentation information in a graphical user interface for manual verification and/or adjustment by a technician, for example. In some instances, the annotation subsystem 1632 may include functionality to determine and apply a classification of the objects discussed herein. The annotation subsystem 1632 may be programmed to perform machine learning algorithms, such as neural networks processes, to perform operations of segmentation and classification.

An exemplary neural network might pass input data through a series of connected layers to produce an output. One example of a neural network may include a convolutional neural network, or CNN. Each layer in a CNN may also comprise another CNN, or may comprise a number of layers. As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), dimensionality reduction algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), ensemble algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

The environment depicted in FIG. 16 might be implemented with one or more computer systems that comprise storage, one or more processor(s), memory, and possibly an operating system The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary environment and computerized system for implementing the systems and methods might include a processor or computer system can be configured to particularly perform some or all of the methods described herein. In some embodiments, the methods can be partially or fully automated by one or more computers or processors. The systems and methods described herein may be implemented using a combination of any of hardware, firmware, and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™ However, the systems and methods described herein may not be limited to these platforms. Instead, the systems and methods described herein may be implemented on any appropriate computer system running any appropriate operating system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc.

The removable storage drive may read from and/or written to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into a computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modern cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a subsystem, component, subroutine, or other unit suitable for use in a computing environment. The software can include, but is not limited to, firmware, resident software, microcode, etc. Protocols such as SOAP/HTTP may be used in implementing interfaces between programming subsystems. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, subsystems, and methods described herein can be implemented using any combination of software or hardware elements. The systems, subsystems, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Similarly, references to "instances" may indicate that various instance(s) of the present disclosure may include a particular feature, structure, or characteristic, but not every instance necessarily includes the particular feature, structure, or characteristic. Further, repeated use of the phrase "in some instances" does not necessarily refer to the same instance, although it may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

Embodiments of the disclosure can be described in view of the follow clauses:

System and Method for Trajectory Validation

1. A collision avoidance system comprising:
one or more processors; and memory that stores instructions which, when executed by the one or more processors, cause the system to perform operations comprising: receiving a trajectory for navigating an autonomous vehicle through the environment; determining, as a staleness validity, whether a first temporal difference between a first time the trajectory was created and a current time satisfies a first time threshold; determining, as a punctuality validity, whether a second temporal difference between a second time the trajectory was received and a third time a previous trajectory was received satisfies a second time threshold; determining, as a feasibility validity, whether the trajectory can be performed by the autonomous vehicle; generating a validity signal based at least in part on one or more of the staleness validity, the punctuality validity, or the kinematic validity; and controlling, based at least in part on the validity signal, the autonomous vehicle in accordance with the trajectory.

2. The system of clause 1, wherein the operations further comprise: receiving a current state of the autonomous vehicle; determining, based at least in part on the trajectory, a potential state of the autonomous vehicle; and determining whether the autonomous vehicle is capable of moving to the potential state based at least in part on the current state.

3. The system of clause 2, wherein the current state of the autonomous vehicle comprises one or more of a first position, a first orientation, a first yaw rate, or a first velocity, wherein the potential state of the autonomous vehicle comprises one or more of a second position, a second orientation, a second yaw rate, or a second velocity; and wherein determining whether the autonomous vehicle is capable of moving to the potential state based at least in part on the current state further comprises: determining at least one of an acceleration or a deceleration in at least one direction for the autonomous vehicle to travel from the current state to the potential state; and determining whether the at least one of the acceleration or the deceleration in the at least one direction satisfies a corresponding feasibility acceleration or deceleration threshold.

4. The system of any of clauses clause 1-3, wherein the operations further comprise: receiving a second trajectory for navigating the autonomous vehicle through the environment, the second trajectory being an alternative to the trajectory; determining a third temporal difference between a fourth time the second trajectory was created and the current time; determining a fourth temporal difference between a fifth time the second trajectory was received and the third time the previous trajectory was received; determining, as a second kinematic validity, whether the second trajectory can be performed by the autonomous vehicle; generating a second validity signal based at least in part on one or more of the third temporal difference, fourth temporal difference or the second kinematic validity; determining a resulting trajectory from at least the trajectory and the second trajectory, based on the validity signal and the second validity signal; and controlling the autonomous vehicle in accordance with the resulting trajectory.

5. The system of clause 4, wherein determining the resulting trajectory comprises: determining the resulting trajectory from at least the trajectory, the second trajectory, and a stored trajectory, wherein the stored trajectory is associated with a third validity value, and wherein selecting the resulting trajectory is based on the validity signal, the second validity signal, and the third validity signal.

6. A method, comprising: receiving a trajectory for navigating a device; determining at least one of: as a consistency validity, whether the trajectory aligns with a current state of the device; as a kinematic validity, whether the trajectory can be performed by the device; or as a punctuality validity, whether the trajectory was received within a time threshold; generating a validity signal based at least in part on one or more of the consistency validity, the kinematic validity, or the punctuality validity; and controlling, based at least in part on the validity signal, the device in accordance with the trajectory.

7. The method of clause 6 further comprising: determining a temporal difference between a time the trajectory was created and a current time; and determining a staleness validity based on whether the temporal difference satisfies a temporal threshold, and wherein generating the validity signal is further based at least in part on the staleness validity.

8. The method of clauses 6 or 7, wherein determining the consistency validity further comprises: generating a projection of the device onto the trajectory; comparing the current state of the device to the projection to generate projection data; and determining the consistency validity based on whether the projection data satisfies at least one deviation threshold.

9. The method of any of clauses 6-8, wherein determining the consistency validity further comprises: generating a projection of the device onto the trajectory; determining at least one physical difference between the current state of the device and the protection, wherein the at least one physical difference comprises a distance; determining the consistency validity based on whether the at least one physical difference satisfies at least one deviation threshold.

10. The method of any of clauses 6-9, wherein determining, as the kinematic validity, whether the trajectory can be performed by the device further comprises: receiving a current state of a device; receiving a potential state of the device to follow the trajectory; and determining whether the device is capable of occupying the potential state based at least in part on the current state.

11. The method of clause 10, wherein the current state of the device comprises one or more of a first position, a first orientation, a first yaw rate, or a first velocity, and wherein the potential state of the device comprises one or more of a second position, a second orientation, a second yaw rate, or a second velocity.

12. The method of any of clauses 6-10, further comprising:
receiving a second trajectory for the device; determining at least one of: as a second consistency validity, whether the second trajectory aligns with a current state of the device; as a second kinematic validity, whether the second trajectory can be performed by the device; or as a second punctuality validity, whether the second trajectory was received within a second time threshold;
generating a second validity signal based at least in part on one or more of the second consistency validity, the second kinematic validity, or the second punctuality validity; and selecting a resulting trajectory from at least the trajectory and the second trajectory, based on the validity signal and the second validity signal; and control the device in accordance with the resulting trajectory.

13. The method of clause 12, further comprising: determining a first collision value indicating whether the device navigating the trajectory will likely result in a collision and a second collision value indicating whether the device navigating the second trajectory will likely result in a collision; and wherein selecting the resulting trajectory from at least the trajectory and the second trajectory is further based on the first collision value and the second collision value.

14. The method of any of clauses 12 or 13, further comprising: receiving an operational status of at least one subsystem of the device; and wherein selecting the resulting trajectory from at least the trajectory and the second trajectory is further based at least in part on the operational status.

15. The method of any of clauses 6-14, further comprising: receiving an operational status of at least one subsystem of the device; reducing a capability limit of the plurality of capability limits based on the operational status to result in a reduced capability limit; and wherein determining, as the kinematic validity, whether the trajectory can be performed by the device is further based on the reduced capacity limit.

16. A non-transitory computer-readable storage medium having stored thereon executable instructions that, when executed by one or more processors of a computer system, cause the computer system to at least: receive a first trajectory and a second trajectory for navigating a device; determine at least one of: a first consistency validity indicating whether the first trajectory is consistent with a current state of the device and a second consistency validity indicating whether the second trajectory is consistent with a current state of the device; a first kinematic validity indicating whether the first trajectory can be performed by the device and a second kinematic validity indicating whether the second trajectory can be performed by the device; or a first punctuality validity indicating whether the first trajectory was received within a time threshold and a second punctuality validity indicating whether the second trajectory was received within the time threshold; determine one of the first trajectory or the second trajectory to result in a selected trajectory based on at least one of the first consistency validity, the second consistency validity, the first kinematic validity, the second kinematic validity, the first punctuality validity, or and the second punctuality validity; and cause the device to operate in accordance with the selected trajectory.

17. The non-transitory computer-readable storage medium of clause 16, wherein the instructions, when executed by the one or more processors of the computer system, further cause the computer system to at least: determine one of the first trajectory or the second trajectory to result in the selected trajectory further based on a hierarchy of trajectories, wherein the hierarchy of trajectories comprises at least the first trajectory and the second trajectory.

18. The non-transitory computer-readable storage medium of clause 17, wherein the first consistency validity indicates whether the first trajectory is consistent in at least one of time or space with a current state of the device; and wherein the second consistency validity indicates whether the second trajectory is consistent in at least one of time or space with the current state of the device.

19. The non-transitory computer-readable storage medium of any of clauses 16-18, wherein the instructions, when executed by the one or more processors of the computer system, further cause the computer system to at least: obtain an operational status of at least one subsystem of the device; and wherein selecting one of the first trajectory or the second trajectory to result in the selected trajectory is further based at least in part on the operational status.

20. The non-transitory computer-readable storage medium of any of clauses 16-19, wherein the instructions for determining the first kinematic validity and the second kinematic validity further comprise instruction, when executed by the one or more processors of the computer system, further cause the computer system to at least: obtain a first set of values indicating a current state of a device; obtain a second set of values indicating a potential state of the device to follow the first trajectory and a third set of values indicating a second potential state of the device to follow the second trajectory; and determine whether the device is capable of occupying the potential state and the second potential state based at least in part on the current state.

Feasibility Validation for Vehicle Trajectory Selection

1. An autonomous vehicle monitoring system, comprising:
one or more processors; and memory that stores instructions which, when executed by the one or more processors, cause the system to: obtain a set of feasibility limits for movement of an autonomous vehicle; receive a current state of the autonomous vehicle; receive a potential trajectory for validation; determine kinematics of the autonomous vehicle to travel to the potential trajectory from the current state; determine a validity signal indicating whether the kinematics satisfy the set of feasibility limits by comparing the kinematics to the feasibility limits; and cause the autonomous vehicle to operate according to the potential trajectory based at least in part on the validity value.

2. The system of clause 1, wherein the set of feasibility limits comprises at least one of a maximum velocity of the autonomous vehicle, a maximum deceleration of the autonomous vehicle in a first direction, a maximum acceleration of the autonomous vehicle in the first direction, a maximum acceleration of the autonomous vehicle in a second direction, and a maximum resultant acceleration.

3. The system of clause 2, wherein determining kinematics of the autonomous vehicle to travel to the trajectory from the current state further comprises determining at least one of a deceleration of the autonomous vehicle in the first direction, an acceleration of the autonomous vehicle in the first direction, an acceleration of the autonomous vehicle in the second direction, and a resultant acceleration.

4. The system of any of clauses 1-3, wherein the set of feasibility limits comprises at least one physical operational limit imposed on the autonomous vehicle, and wherein the instructions which, when executed by the one or more processors, further cause the system to: updated at least one value of the set of feasibility limits based on a current operational status of at least one subsystem of the autonomous vehicle.

5. The system of any of clauses 1-4, wherein determining kinematics of the autonomous vehicle to travel to the potential trajectory from the current state further comprises: determining a first position on the potential trajectory; comparing the first position to a second position associated with the current state of the autonomous vehicle.

6. A method, comprising: obtaining at least one feasibility limit for movement of a device, the at least one feasibility limit comprising an acceleration or a deceleration limit in at least one direction; receiving a current state of the device; receiving a potential trajectory for validation; determining kinematics of the device to travel to the trajectory from the current state; and determining a validity value indicating whether the kinematics satisfy the at least one feasibility limit.

7. The method of clause 6, wherein the at least one feasibility limit comprises at least one physical operational limit imposed on the device to increase safety in operation of the device.

8. The method of clauses 6 or 7, further comprising updating at least one feasibility limit based on a current operational status of at least one subsystem of the device.

9. The method of any of clauses 6-8, wherein the at least one feasibility limit further comprises a least one of a maximum velocity of the device, a maximum acceleration of the device, a maximum deceleration of the device, or a maximum lateral acceleration of the device.

10. The method of clause 9, wherein the device is an autonomous vehicle, and wherein determining kinematics of the device to travel to the trajectory from the current state further comprises determining at least one of a deceleration of the autonomous vehicle in the first direction, an acceleration of the autonomous vehicle in the first direction, or an acceleration of the autonomous vehicle in a lateral direction.

11. The method of any of clauses 6-10, wherein determining kinematics of the device to travel to the potential trajectory from the current state further comprises: determining a first position on the potential trajectory; and comparing the first position to a second position associated with the current state of the autonomous vehicle.

12. The method of clause 11, wherein determining the first position on the potential trajectory further comprises determining the first position to minimize a distance between the first position and the second position.

13. The method of any of clauses 6-12, wherein the at least one feasibility limit is determined based on a current trajectory of the device or the potential trajectory of the device.

14. The method of any of clauses 6-13, further comprising: causing the device to operate according to the potential trajectory based at least in part on the validity value.

15. A non-transitory computer-readable storage medium having stored thereon executable instructions that, when executed by one or more processors of a computer system, cause the computer system to at least: obtain at least one feasibility limit for movement of an autonomous vehicle, the at least one feasibility limit comprising an acceleration or a deceleration limit in at least one direction; receive a current state of the autonomous vehicle; determine kinematics of the autonomous vehicle to travel to the trajectory from the current state; and determine a validity value indicating whether the kinematics are equal to or below the at least one feasibility limit.

16. The non-transitory computer-readable storage medium of clause 15, wherein the at least one feasibility limit comprises at least one physical operational limit of the device.

17. The non-transitory computer-readable storage medium of clauses 15 or 16, wherein the at least one feasibility limit further comprises a least one of a maximum velocity of the device, a maximum acceleration of the device, a maximum deceleration of the device, or a maximum lateral acceleration of the device.

18. The non-transitory computer-readable storage medium of clause 17, wherein determining kinematics of the device to travel to the trajectory from the current state further comprises determining at least one of a deceleration of the autonomous vehicle in the first direction, an acceleration of the autonomous vehicle in the first direction, or an acceleration of the autonomous vehicle in a lateral direction.

19. The non-transitory computer-readable storage medium of any of clauses 5-18, wherein the executable instructions, as a result of being executed by one or more processors of a computer system, further cause the computer system to at least: update at least one feasibility limit based on a current operational status of at least one subsystem of the device.

20. The non-transitory computer-readable storage medium of any of clauses 15-19, wherein the at least one feasibility limit is determined based on a current trajectory of the device or the potential trajectory of the device.

Consistency Validation for Vehicle Trajectory Selection

1. A collision avoid system comprising: one or more processors; and memory that stores instructions which, when executed by the one or more processors, cause the system to: receive a first set of values indicating a current state of an autonomous vehicle, the first set of values comprising one or more of a first position, a first orientation, a first yaw rate, or a first velocity; receive a potential trajectory for the autonomous vehicle; determine a second set of values indicating a potential state of the autonomous vehicle on the potential trajectory, the second set of values comprising one or more of a second position, a second orientation, a second yaw rate, or a second velocity; determine, as a validity signal, whether the second set of values differs from the first set of values by a set of corresponding threshold amounts; and cause the autonomous vehicle to operate according to the potential trajectory based at least in part on the validity signal.

2. The system of clause 1, wherein the set of threshold amounts comprising at least two of a distance threshold, a time threshold, a steering threshold, a yaw threshold, a velocity deviation threshold, or a collinearity threshold.

3. The system of clause 2, wherein determining the validity value further comprises: performing a comparison of the first set of values to the second set of values to determine a set of deviation values; and determining the validity signal based at least in part on performing a second comparison of the set of deviation values to the set of threshold amounts.

4. The system of clauses 2 or 3, wherein determining the second set of values comprises determining the second position based on proximity to the first position.

5. The system any of clauses 1-4, wherein the instructions, when executed by the one or more processors, further cause the system to: receive a second potential trajectory for the autonomous vehicle; determine a third set of values indicating a second potential state of the autonomous vehicle to follow the second potential trajectory, the third set of values comprising one or more of a third position, a third orientation, a third yaw rate, or a third velocity; determine, as a second validity signal, whether the autonomous vehicle is capable of occupying the second potential state based at least in part on the current state; select one of the potential trajectory or the second potential trajectory to result in a selected trajectory based on the validity signal and the second validity signal; and cause the autonomous vehicle to operate according to the selected trajectory.

6. A method, comprising: obtaining a current state of a device on a current trajectory; obtaining a potential state of the device to follow a potential trajectory; determining a validity value indicating whether the potential state differs from the current state by at least one threshold amount to indicate whether the potential trajectory is consistent with the current trajectory; and causing the device to operate according to the potential trajectory based at least in part on the validity value.

7. The method of clause 6, wherein the current state of the device comprises one or more of a first position, a first orientation, a first yaw rate, or a first velocity, and wherein the potential state of the device comprises one or more of a second position, a second orientation, a second yaw rate, or a second velocity.

8. The method of clause 7, wherein the at least one threshold comprises at least one of a distance difference, a time difference, a steering threshold, a yaw threshold, a velocity deviation threshold, or a collinearity threshold.

9. The method of any of clauses 6-8, wherein determining the validity value further comprises: performing a comparison of the current state and the potential state to determine a set of deviation values; and determining the validity signal based at least in part on performing a second comparison of the set of deviation values to the at least one threshold amount.

10. The method of any of clauses 6-9, wherein the current state comprises a first position, and wherein obtaining the potential state of the device further comprises: determining a second location on the potential trajectory that is the shortest distance away from the first position.

11. The method of any of clauses 6-10, wherein determining the validity value further comprises determining whether the potential trajectory is collinear with the current trajectory.

12. The method of any of clauses 6-11, wherein the at least one threshold is determined independent of an operating condition of the device.

13. The method of any of clauses 6-12, wherein determining the validity value indicating is further based at least in part on a temporal difference between a first time the potential trajectory was created and a current time.

14. The method of any of clauses 6-14, further comprising: obtaining a third set of values indicating a second potential state of the device to follow a second potential trajectory; determining a second validity value indicating whether the device is capable of occupying the second potential state based at least in part on the current state; and selecting one of the potential trajectory or the second potential trajectory to result in a selected trajectory based on the validity value and the second validity value; and cause the device to operate according to the selected trajectory.

16. A non-transitory computer-readable storage medium having stored thereon executable instructions that, when executed by one or more processors of a computer system, cause the computer system to at least: receive a first state of a device navigating first trajectory, the first state comprising at least one of a first position and a first velocity; receive a potential state of the device to follow a potential trajectory, the potential state comprising at least one of a second position and a second velocity; determine a validity value indicating whether first state is within at least one threshold value of the second state; and causing the device to operate according to the potential trajectory based at least in part on the validity value.

17. The non-transitory computer-readable storage medium of clause 16, wherein determining the validity value further comprises: determining a distance between the first position and the second position; comparing the distance to a distance threshold of the at least one threshold values; determining a velocity difference between the first velocity and the second velocity; and comparing the velocity difference to a velocity threshold of the at least one threshold values.

18. The non-transitory computer-readable storage medium of clauses 16 or 17, wherein the first state of the device further comprises at least one of a first orientation, or a first yaw rate, and wherein the potential state of the device comprises one or more of a second orientation or a second yaw rate.

19. The non-transitory computer-readable storage medium of any of clauses 16-18, wherein determining the validity value is further based at least in part on a temporal difference between a first time the potential trajectory was created and a current time.

20. The non-transitory computer-readable storage medium of any of clauses 16-19, wherein determining the at least one threshold comprises at least one of a distance difference, a time difference, a steering threshold, a yaw threshold, a velocity deviation threshold, or a collinearity threshold.

Modifying Limits on Vehicle Dynamics for Trajectories

1. An autonomous vehicle monitoring system, comprising: one or more processors; and memory that stores instructions which, when executed by the one or more processors, cause the system to: receive inputs from a plurality of sensors of an autonomous vehicle, an input of the plurality of inputs associated with an operational state of a subsystem of the autonomous vehicle; determine, based at least in part on the input, whether the subsystem is operating in a reduced operational state; determine, based at least in part on determining the subsystem is operating in the reduced operational state, a reduced capability limit of a plurality of capability limits, the reduced capability limit being less than a nominal operating capability limit; receive a potential trajectory for the autonomous vehicle; and determine a validity signal indicating whether the autonomous vehicle following the potential trajectory would exceed the reduced capability limit.

2. The system of clause 1, wherein the reduced operational state is one of multiple operational states, and wherein determining the reduced the capability limit comprises determining an amount to reduce the nominal operating capability limit based at least in part on a difference between the reduced operational state and a normal operating state of the subsystem.

3. The system of clauses 1 or 2, wherein the plurality of capability limits comprise at least one of a maximum velocity of the autonomous vehicle, a maximum deceleration of the autonomous vehicle in a first direction, a maximum acceleration of the autonomous vehicle in the first direction, a maximum acceleration of the autonomous vehicle in a second direction, or a maximum resultant acceleration.

4. The system of any of clauses 1-3 wherein the instructions, when executed by the one or more processors, further cause the system to: reduce the capability limit by an amount based at least in part on at least one characteristic of the potential trajectory.

5. The system of any of clauses 1-4, wherein determining the validity signal further comprises: obtaining a first set of values indicating a first state of the autonomous vehicle; obtaining a second set of values indicating a potential state of the autonomous vehicle to follow the potential trajectory; determining, as the validity signal, whether the device is capable of occupying the potential state based at least in part on the first state and the reduced capacity limit.

6. A method, comprising: receiving a signal associated with an operating status of a subsystem of a device, the signal indicative of a reduced operating status of the subsystem; determining a capability limit to impose on the device based on the signal; receive a trajectory for the device to traverse; determine a validity signal indicating whether the device following the potential trajectory would exceed the capability limit; and cause the device to operate according to the potential trajectory based at least in part on the validity signal.

7. The method of clause 6, wherein determining the capability limit comprises determining an amount to reduce a default capability limit based on the signal.

8. The method of clause 7, wherein the amount to reduce the default capability limit is determined based at least in part on a difference between the reduced operational state and a normal operating state of the subsystem.

9. The method of any of clauses 6-8, further comprising: receiving a second signal associated with a second operating status of a second subsystem of the device, the second signal indicative of a second reduced operating status of the second subsystem; and determining the capability limit to impose on the device based on the signal and the second signal.

10. The method of any of clauses 6-9, wherein the capability limit comprises at least one of a maximum velocity of the device, a maximum deceleration of the device in a first direction, a maximum acceleration of the device in the first direction, a maximum acceleration of the device in a second direction, a maximum resultant acceleration, a maximum yaw rate, a maximum yaw acceleration, or a max grade.

11. The method of any of clauses 6-10, wherein determining the capability limit to impose on the device comprises reducing the capability limit by an amount determined based at least in part on at least one characteristic of the trajectory.

12. The method of any of clauses 6-11, further comprising: determining a second capability limit to impose on the device based on whether a second signal indicative of a second operating status of the subsystem is received within a time period.

13. The method of any of clauses 6-12, further comprising: receiving a second signal indicative of an increased or restored operating status of the subsystem; increase the capability limit based on the second signal to result in an increased capability limit; determine a second validity signal indicating whether the device following the potential trajectory would exceed the increased capability limit.

14. The method of any of clauses 6-13, wherein determining the validity signal further comprises: obtaining a first set of values indicating a first state of the device; obtaining a second set of values indicating a potential state of the device to follow the trajectory; determining, as the validity signal, whether the device is capable of occupying the potential state based at least in part on the first state and the capacity limit.

15. A non-transitory computer-readable storage medium having stored thereon executable instructions that, when executed by one or more processors of a computer system, cause the computer system to at least: receive an input from a sensor of a device, the input associated with a subsystem of the device; determine an operational limit to impose on the device based on the input; receive a trajectory for the device to traverse; determine a validity signal indicating whether the device following the trajectory would exceed the operational limit; and cause the device to operate according to the trajectory based at least in part on the validity signal.

16. The non-transitory computer-readable storage medium of clause 15, wherein the operational limit comprises a reduced operational limit which is less than a nominal operational limit, and wherein the instructions, when executed by the one or more processors, further cause the computer system to: determine the operational limit from a plurality of operational limits, based at least in part on the subsystem associated with the input.

17. The non-transitory computer-readable storage medium of clause 16, wherein determining the operational limit comprises: determining an amount to limit at least one operational characteristic of the device based on the input.

18. The non-transitory computer-readable storage medium of clause 17, wherein the operational characteristic of the device comprises at least one of a maximum velocity of the device, a maximum deceleration of the device in a first direction, a maximum acceleration of the device in the first direction, a maximum acceleration of the device in a second direction, a maximum resultant acceleration, a maximum yaw rate, a maximum yaw acceleration, or a maximum grade.

19. The non-transitory computer-readable storage medium of clauses 17 or 18, wherein the amount to limit the at least one operational characteristic of the device is determined from a set of amounts corresponding to different inputs indicating different levels of operation of the subsystem.

20. The non-transitory computer-readable storage medium of any of clauses 15-19, wherein determining the validity signal further comprises: obtain a first set of values indicating a first state of the device; obtain a second set of values indicating a potential state of the device to follow the trajectory; determining whether the device is capable of moving from the first state of the device to the potential state of the device to follow the trajectory based at least in part on the operational limit

What is claimed is:

1. A collision avoid system comprising:
one or more processors; and
memory that stores instructions which, when executed by the one or more processors, cause the system to:
receive a first set of values indicating a current state of an autonomous vehicle, the first set of values comprising one or more of a first position, a first orientation, a first yaw rate, or a first velocity;
receive a potential trajectory for the autonomous vehicle;
determine a second set of values indicating a potential state of the autonomous vehicle on the potential trajectory, the second set of values comprising one or more of a second position, a second orientation, a second yaw rate, or a second velocity;

determine, as a validity signal, whether the second set of values differs from the first set of values by a set of corresponding threshold amounts, wherein the set of corresponding threshold amounts comprises at least two of a distance threshold, a time threshold, a steering threshold, a yaw threshold, a velocity deviation threshold, or a collinearity threshold; and cause the autonomous vehicle to operate according to the potential trajectory based at least in part on the validity signal.

2. The system of claim 1, wherein determining the validity value further comprises:

performing a comparison of the first set of values to the second set of values to determine a set of deviation values; and determining the validity signal based at least in part on performing a second comparison of the set of deviation values to the set of threshold amounts.

3. The system of claim 1, wherein determining the second set of values comprises determining the second position based on proximity to the first position.

4. The system of claim 1, wherein the instructions, when executed by the one or more processors, further cause the system to:

receive a second potential trajectory for the autonomous vehicle;

determine a third set of values indicating a second potential state of the autonomous vehicle to follow the second potential trajectory, the third set of values comprising one or more of a third position, a third orientation, a third yaw rate, or a third velocity;

determine, as a second validity signal, whether the autonomous vehicle is capable of occupying the second potential state based at least in part on the current state;

select one of the potential trajectory or the second potential trajectory to result in a selected trajectory based on the validity signal and the second validity signal; and cause the autonomous vehicle to operate according to the selected trajectory.

5. A method, comprising:

obtaining a current state of a device on a current trajectory;

obtaining a potential state of the device to follow a potential trajectory;

determining a validity value indicating whether the potential state differs from the current state by at least two threshold amounts to indicate whether the potential trajectory is consistent with the current trajectory, wherein the at least two threshold amounts comprises at least two of a distance difference, a time difference, a steering threshold, a yaw threshold, a velocity deviation threshold, or a collinearity threshold; and causing the device to operate according to the potential trajectory based at least in part on the validity value.

6. The method of claim 5, wherein the current state of the device comprises one or more of a first position, a first orientation, a first yaw rate, or a first velocity, and wherein the potential state of the device comprises one or more of a second position, a second orientation, a second yaw rate, or a second velocity.

7. The method of claim 5, wherein determining the validity value further comprises:

performing a comparison of the current state and the potential state to determine a set of deviation values; and determining the validity signal based at least in part on performing a second comparison of the set of deviation values to the at least two threshold amounts.

8. The method of claim 5, wherein the current state comprises a first position, and wherein obtaining the potential state of the device further comprises:

determining a second location on the potential trajectory that is the shortest distance away from the first position.

9. The method of claim 5, wherein determining the validity value further comprises determining whether the potential trajectory is collinear with the current trajectory.

10. The method of claim 5, wherein the at least two threshold amounts are determined independent of an operating condition of the device.

11. The method of claim 5, wherein determining the validity value indicating is further based at least in part on a temporal difference between a first time the potential trajectory was created and a current time.

12. The method of claim 5, further comprising:

obtaining a third set of values indicating a second potential state of the device to follow a second potential trajectory;

determining a second validity value indicating whether the device is capable of occupying the second potential state based at least in part on the current state;

selecting one of the potential trajectory or the second potential trajectory to result in a selected trajectory based on the validity value and the second validity value; and cause the device to operate according to the selected trajectory.

13. A non-transitory computer-readable storage medium having stored thereon executable instructions that, when executed by one or more processors of a computer system, cause the computer system to at least:

receive a first state of a device navigating first trajectory, the first state comprising at least one of a first position and a first velocity;

receive a potential state of the device to follow a potential trajectory, the potential state comprising at least one of a second position and a second velocity;

determine a validity value indicating whether first state is within at least one threshold value of the second state, wherein the at least one threshold value comprises at least two of a distance difference, a time difference, a steering threshold, a yaw threshold, a velocity difference, or a collinearity threshold; and cause the device to operate according to the potential trajectory based at least in part on the validity value.

14. The non-transitory computer-readable storage medium of claim 13, wherein determining the validity value further comprises:

determining a distance between the first position and the second position;

comparing the distance to the distance difference of the at least one threshold value;

determining a velocity difference between the first velocity and the second velocity; and comparing the velocity difference to the velocity threshold of the at least one threshold value.

15. The non-transitory computer-readable storage medium of claim 13, wherein the first state of the device further comprises at least one of a first orientation, or a first yaw rate, and wherein the potential state of the device comprises one or more of a second orientation or a second yaw rate.

16. The non-transitory computer-readable storage medium of claim 13, wherein determining the validity value is further based at least in part on a temporal difference between a first time the potential trajectory was created and a current time.

* * * * *